(12) United States Patent
Wang et al.

(10) Patent No.: US 12,228,792 B2
(45) Date of Patent: Feb. 18, 2025

(54) OPTICAL IMAGING LENS GROUP INCLUDING SIX LENSES OF -+--+- REFRACTIVE POWERS

(71) Applicant: ZHEJIANG SUNNY OPTICS CO.,LTD., Zhejiang (CN)

(72) Inventors: Xiaofang Wang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 551 days.

(21) Appl. No.: 17/527,190

(22) Filed: Nov. 16, 2021

(65) Prior Publication Data
US 2022/0155560 A1 May 19, 2022

(30) Foreign Application Priority Data
Nov. 17, 2020 (CN) .......................... 202011285775.X

(51) Int. Cl.
*G02B 13/00* (2006.01)
*G02B 9/62* (2006.01)
(52) U.S. Cl.
CPC ........... *G02B 9/62* (2013.01); *G02B 13/0045* (2013.01)

(58) Field of Classification Search
CPC .............................. G02B 9/62; G02B 13/0045
See application file for complete search history.

(56) References Cited

U.S. PATENT DOCUMENTS

| 2019/0196144 | A1* | 6/2019 | Chen | .................. G02B 27/0025 |
| 2021/0109326 | A1* | 4/2021 | Jia | ............................. G02B 9/62 |
| 2021/0389557 | A1* | 12/2021 | Zou | ......................... G02B 13/04 |

FOREIGN PATENT DOCUMENTS

CN          109100854 A  * 12/2018  ......... G02B 13/0045

* cited by examiner

*Primary Examiner* — Wen Huang
(74) *Attorney, Agent, or Firm* — Samson G. Yu

(57) ABSTRACT

The disclosure provides an optical imaging lens group, which sequentially includes from an object side to an image side along an optical axis: a first lens with a negative refractive power; a second lens with a refractive power; a third lens with a refractive power, an image-side surface thereof is a concave surface; a fourth lens with a negative refractive power; a fifth lens with a refractive power; and a sixth lens with a refractive power. Semi-FOV is a half of a maximum field of view of the optical imaging lens group, and Semi-FOV satisfies 45°<Semi-FOV<55°. A curvature radius R1 of an object-side surface of the first lens, a curvature radius R2 of an image-side surface of the first lens, a curvature radius R3 of an object-side surface of the second lens and a curvature radius R4 of an image-side surface of the second lens satisfy 0.5<(R1+R2)/(R3−R4)<1.5.

18 Claims, 15 Drawing Sheets longitudinal aberration curve longitudinal aberration curve astigmatism curve longitudinal aberration curve longitudinal aberration curve (millimeter)

OPTICAL IMAGING LENS GROUP INCLUDING SIX LENSES OF −+−+− REFRACTIVE POWERS

CROSS-REFERENCE TO RELATED PRESENT INVENTION(S)

The disclosure claims priority to and the benefit of Chinese Patent Present invention No. 202011285775.X, filed in the China National Intellectual Property Administration (CNIPA) on 17 Nov. 2020, which is incorporated herein by reference in its entirety.

TECHNICAL FIELD

The disclosure relates to the technical field of optical elements, and more particularly to an optical imaging lens group.

BACKGROUND

With the rapid development of portable electronic products such as smart phones and tablet computers, users have made increasing requirements on the appearance and performance of the portable electronic products such as mobile phones and tablet computers. Meanwhile, market requirements on in-screen fingerprint unlocking functions of electronic products have increased. In order to satisfy the market requirements, electronic products with in-screen fingerprint unlocking functions gradually emerge. However, at present, luminous fluxes of in-screen cameras of most electronic products are relatively low, and thus in-screen fingerprint unlocking functions have some defects.

SUMMARY

An embodiment of the disclosure provides an optical imaging lens group, which sequentially includes from an object side to an image side along an optical axis: a first lens with a negative refractive power; a second lens with a refractive power; a third lens with a refractive power, an image-side surface thereof is a concave surface; a fourth lens with a negative refractive power; a fifth lens with a refractive power; and a sixth lens with a refractive power. Semi-FOV is a half of a maximum field of view of the optical imaging lens group, and Semi-FOV may satisfy 45°<Semi-FOV<55°. A curvature radius R1 of an object-side surface of the first lens, a curvature radius R2 of an image-side surface of the first lens, a curvature radius R3 of an object-side surface of the second lens and a curvature radius R4 of an image-side surface of the second lens may satisfy 0.5<(R1+R2)/(R3−R4)<1.5.

In an implementation mode, the object-side surface of the first lens to an image-side surface of the sixth lens includes at least one aspheric mirror surface.

In an implementation mode, an effective focal length f2 of the second lens and the curvature radius R3 of the object-side surface of the second lens may satisfy 0.4<f2/R3<0.9.

In an implementation mode, a combined focal length f123 of the first lens, the second lens and the third lens and a combined focal length f45 of the fourth lens and the fifth lens may satisfy 0.3<f45/f123<1.3.

In an implementation mode, an effective focal length f4 of the fourth lens, an effective focal length f5 of the fifth lens and an effective focal length f6 of the sixth lens may satisfy 0<(f6−f5)/f4<1.0.

In an implementation mode, SAG22 is a distance from an intersection point of the image-side surface of the second lens and the optical axis to an effective radius vertex of the image-side surface of the second lens on the optical axis, SAG52 is a distance from an intersection point of an image-side surface of the fifth lens and the optical axis to an effective radius vertex of the image-side surface of the fifth lens on the optical axis, and SAG22 and SAG52 may satisfy 0.2<SAG22/SAG52<0.7.

In an implementation mode, an object-side surface of the sixth lens has at least one point of inflection, and a vertical distance Yc61 from the point of inflection to the optical axis and a maximum effective radius DT61 of the object-side surface of the sixth lens may satisfy 0<Yc61/DT61<1.0.

In an implementation mode, a maximum effective radius DT21 of the object-side surface of the second lens and a maximum effective radius DT41 of an object-side surface of the fourth lens may satisfy 0.3<DT21/DT41<0.8.

In an implementation mode, a curvature radius R6 of the image-side surface of the third lens, a curvature radius R10 of an image-side surface of the fifth lens, a curvature radius R11 of an object-side surface of the sixth lens and a curvature radius R12 of an image-side surface of the sixth lens may satisfy 0.3<(R11+R12)/(R6−R10)<2.0.

In an implementation mode, a center thickness CT1 of the first lens on the optical axis, a center thickness CT3 of the third lens on the optical axis, an edge thickness ET1 of the first lens and an edge thickness ET3 of the third lens may satisfy 1.5<CT1/ET1+CT3/ET3<2.0.

In an implementation mode, a center thickness CT5 of the fifth lens on the optical axis and a center thickness CT6 of the sixth lens on the optical axis may satisfy 0.2<CT6/CT5<0.7.

In an implementation mode, ΣAT is a sum of spacing distances of any two adjacent lenses in the first lens to the sixth lens, and ΣAT and a spacing distance T34 of the third lens and the fourth lens on the optical axis may satisfy 0.3<T34/ΣAT<0.8.

In an implementation mode, the object-side surface of the first lens is a convex surface, and the image-side surface of the first lens is a concave surface; the second lens has a positive refractive power, the object-side surface thereof is a convex surface, and the image-side surface thereof is a convex surface; the third lens has a negative refractive power; the fifth lens has a positive refractive power, an image-side surface thereof is a convex surface; the sixth lens has a negative refractive power, an object-side surface thereof is a convex surface, and an image-side surface thereof is a concave surface.

In an implementation mode, EPD is an entrance pupil diameter of the optical imaging lens group, and EPD and a total effective focal length f of the optical imaging lens group may satisfy f/EPD<1.7.

In an implementation mode, TTL is a distance from the object-side surface of the first lens to an imaging surface of the optical imaging lens group on the optical axis, ImgH is a half of a diagonal length of an effective pixel region on the imaging surface of the optical imaging lens group, and TTL and ImgH may satisfy TTL/ImgH<1.5.

Another embodiment of the disclosure provides an optical imaging lens group, which sequentially includes from an object side to an image side along an optical axis: a first lens with a negative refractive power; a second lens with a refractive power; a third lens with a refractive power, an image-side surface thereof is a concave surface; a fourth lens with a negative refractive power; a fifth lens with a refractive power; and a sixth lens with a refractive power. Semi-FOV is a half of a maximum field of view of the optical imaging lens group, and Semi-FOV may satisfy $45°<\text{Semi-FOV}<55°$. A combined focal length f123 of the first lens, the second lens and the third lens and a combined focal length f45 of the fourth lens and the fifth lens may satisfy $0.3<f45/f123<1.3$.

In an implementation mode, an effective focal length f2 of the second lens and a curvature radius R3 of an object-side surface of the second lens may satisfy $0.4<f2/R3<0.9$.

In an implementation mode, an effective focal length f4 of the fourth lens, an effective focal length f5 of the fifth lens and an effective focal length f6 of the sixth lens may satisfy $0<(f6-f5)/f4<1.0$.

In an implementation mode, SAG22 is a distance from an intersection point of an image-side surface of the second lens and the optical axis to an effective radius vertex of the image-side surface of the second lens on the optical axis, SAG52 is a distance from an intersection point of an image-side surface of the fifth lens and the optical axis to an effective radius vertex of the image-side surface of the fifth lens on the optical axis, and SAG22 and SAG52 may satisfy $0.2<\text{SAG22}/\text{SAG52}<0.7$.

In an implementation mode, an object-side surface of the sixth lens has at least one point of inflection, and a vertical distance Yc61 from the point of inflection to the optical axis and a maximum effective radius DT61 of the object-side surface of the sixth lens may satisfy $0<\text{Yc61}/\text{DT61}<1.0$.

In an implementation mode, a maximum effective radius DT21 of an object-side surface of the second lens and a maximum effective radius DT41 of an object-side surface of the fourth lens may satisfy $0.3<\text{DT21}/\text{DT41}<0.8$.

In an implementation mode, a curvature radius R6 of the image-side surface of the third lens, a curvature radius R10 of an image-side surface of the fifth lens, a curvature radius R11 of an object-side surface of the sixth lens and a curvature radius R12 of an image-side surface of the sixth lens may satisfy $0.3<(R11+R12)/(R6-R10)<2.0$.

In an implementation mode, a center thickness CT1 of the first lens on the optical axis, a center thickness CT3 of the third lens on the optical axis, an edge thickness ET1 of the first lens and an edge thickness ET3 of the third lens may satisfy $1.5<\text{CT1}/\text{ET1}+\text{CT3}/\text{ET3}<2.0$.

In an implementation mode, a center thickness CT5 of the fifth lens on the optical axis and a center thickness CT6 of the sixth lens on the optical axis may satisfy $0.2<\text{CT6}/\text{CT5}<0.7$.

In an implementation mode, $\Sigma AT$ is a sum of spacing distances of any two adjacent lenses in the first lens to the sixth lens, and $\Sigma AT$ and a spacing distance T34 of the third lens and the fourth lens on the optical axis may satisfy $0.3<\text{T34}/\Sigma AT<0.8$.

In an implementation mode, a curvature radius R1 of an object-side surface of the first lens, a curvature radius R2 of an image-side surface of the first lens, a curvature radius R3 of an object-side surface of the second lens and a curvature radius R4 of an image-side surface of the second lens may satisfy $0.5<(R1+R2)/(R3-R4)<1.5$.

In an implementation mode, an object-side surface of the first lens is a convex surface, and an image-side surface of the first lens is a concave surface; the second lens has a positive refractive power, an object-side surface thereof is a convex surface, and an image-side surface thereof is a convex surface; the third lens has a negative refractive power; the fifth lens has a positive refractive power, an image-side surface thereof is a convex surface; the sixth lens has a negative refractive power, and an object-side surface thereof is a convex surface, and an image-side surface thereof is a concave surface.

In an implementation mode, EPD is an entrance pupil diameter of the optical imaging lens group, and EPD and a total effective focal length f of the optical imaging lens group may satisfy $f/\text{EPD}<1.7$.

In an implementation mode, TTL is a distance from an object-side surface of the first lens to an imaging surface of the optical imaging lens group on the optical axis, ImgH is a half of a diagonal length of an effective pixel region on the imaging surface of the optical imaging lens group, and TTL and ImgH may satisfy $\text{TTL}/\text{ImgH}<1.5$.

According to the disclosure, the refractive power is configured reasonably, and optical parameters are optimized, so that the provided optical imaging lens group is applicable to a portable electronic product and has the characteristics of ultra-thin design, small size, large aperture and high imaging quality.

BRIEF DESCRIPTION OF THE DRAWINGS

The other features, objectives and advantages of the disclosure become more apparent upon reading detailed descriptions made to unrestrictive embodiments with reference to the following drawings.

DETAILED DESCRIPTION OF THE EMBODIMENTS

Figure 1:
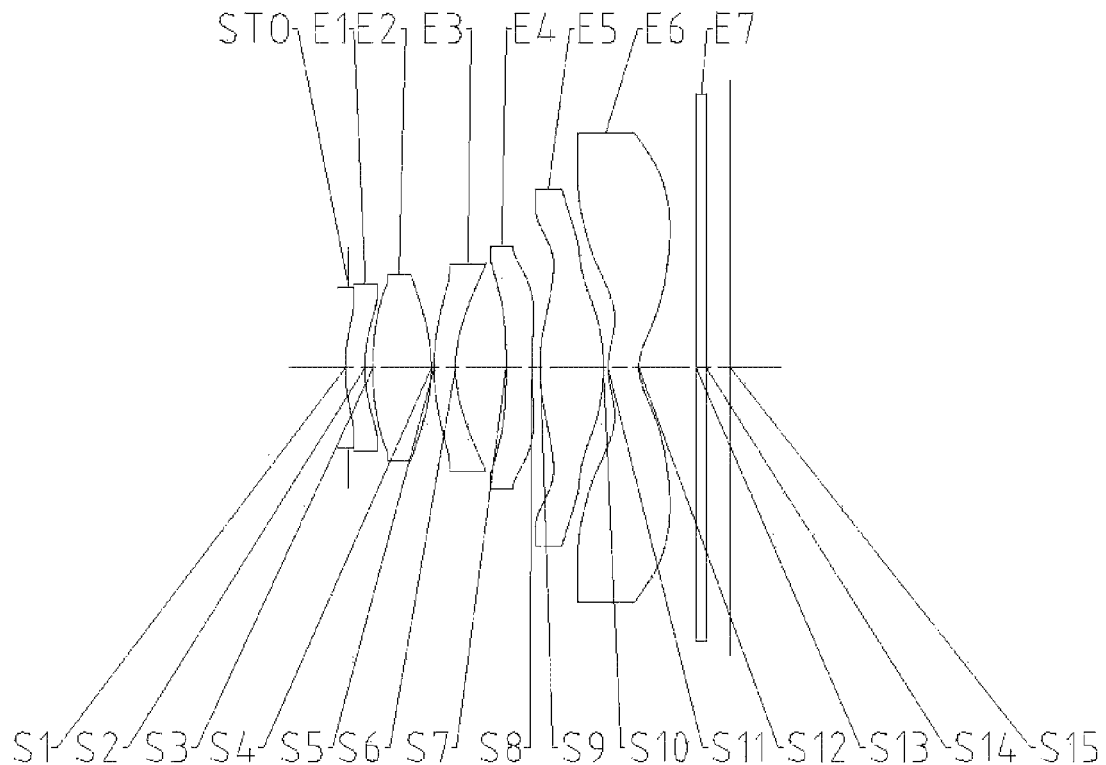
FIG. 1 shows a structural schematic diagram of an optical imaging lens group according to Embodiment 1 of the disclosure.

In order to understand the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have the same meanings as those in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens group according to an exemplary embodiment of the disclosure may include six lenses with refractive power, i.e., a first lens, a second lens, a third lens, a fourth lens, a fifth lens, and a sixth lens respectively. The six lenses are sequentially arranged from an object side to an image side along an optical axis. There may be a spacing distance between any two adjacent lenses in the first lens to the sixth lens.

In an exemplary embodiment, the first lens may have a negative refractive power; the second lens may have a positive refractive power or a negative refractive power; the third lens may have a positive refractive power or a negative refractive power, an image-side surface thereof may be a concave surface; the fourth lens may have a negative refractive power; the fifth lens may have a positive refractive power or a negative refractive power; the sixth lens may have a positive refractive power or a negative refractive power.

In an exemplary embodiment, the refractive power and surface type features of each lens are set reasonably, so that a low-order aberration of the lens group may be effectively reduced, and the imaging quality may be improved.

In an exemplary embodiment, an object-side surface of the first lens may be a convex surface, and an image-side surface of the first lens may be a concave surface. Such the surface types setting of the first lens is favorable for converging light.

In an exemplary embodiment, the second lens may have a positive refractive power, an object-side surface thereof may be a convex surface, and an image-side surface may be a convex surface; the third lens may have a negative refractive power; the fifth lens may have a positive refractive power, an image-side surface thereof may be a convex surface; the sixth lens may have a negative refractive power, an object-side surface thereof may be a convex surface, and an image-side surface thereof may be a concave surface. Such the refractive power and surface types setting of the second lens, the third lens, the fifth lens and the sixth lens like thick may effectively balance a negative spherical aberration generated by the second lens, a positive spherical aberration generated by the third lens, a negative spherical aberration generated by the fifth lens and a positive spherical aberration generated by the sixth lens to finally contribute to making an aberration of the whole lens group relatively low and improving the resolving power of the lens group.

In an exemplary embodiment, the optical imaging lens group according to the disclosure may satisfy $45°<$Semi-FOV$<55°$, wherein Semi-FOV is a half of a maximum field of view of the optical imaging lens group. More specifically, Semi-FOV may further satisfy $45°<$Semi-FOV$<47°$. Satisfying $45°<$Semi-FOV$<55°$ is favorable for achieving a relatively large field of view of the lens group and improving an imaging range.

In an exemplary embodiment, the optical imaging lens group according to the disclosure may satisfy $0.4<f2/R3<0.9$, wherein f2 is an effective focal length of the second lens, and R3 is a curvature radius of an object-side surface of the second lens. More specifically, f2 and R3 may further satisfy $0.4<f2/R3<0.8$. $0.4<f2/R3<0.9$ is satisfied, so that a negative spherical aberration generated by the second lens may be reduced, and the imaging performance of the lens group may be improved.

In an exemplary embodiment, the optical imaging lens group according to the disclosure may satisfy 0.5<(R1+R2)/(R3−R4)<1.5, wherein R1 is a curvature radius of an object-side surface of the first lens, R2 is a curvature radius of an image-side surface of the first lens, R3 is a curvature radius of an object-side surface of the second lens, and R4 is a curvature radius of an image-side surface of the second lens. More specifically, R1, R2, R3 and R4 may further satisfy 0.6<(R1+R2)/(R3−R4)<1.4. 0.5<(R1+R2)/(R3−R4)<1.5 is satisfied, so that shapes of the first lens and the second lens may be effectively controlled to further contribute to controlling a refraction angle of a beam entering the lens group and achieving high machinability of the lens group to match the lens group and a chip better.

In an exemplary embodiment, the optical imaging lens group according to the disclosure may satisfy 0.3<f45/f123<1.3, wherein f123 is a combined focal length of the first lens, the second lens and the third lens, and f45 is a combined focal length of the fourth lens and the fifth lens. More specifically, f45 and f123 may further satisfy 0.3<f45/f123<1.1. 0.3<f45/f123<1.3 is satisfied, so that contributions of the front lenses to a field curvature of the lens group may be effectively balanced to ensure the field curvature of the lens group in a reasonable range.

In an exemplary embodiment, the optical imaging lens group according to the disclosure may satisfy 0<(f6−f5)/f4<1.0, wherein f4 is an effective focal length of the fourth lens, f5 is an effective focal length of the fifth lens, and f6 is an effective focal length of the sixth lens. More specifically, f6, f5 and f4 may further satisfy 0.2<(f6−f5)/f4<0.9. 0<(f6−f5)/f4<1.0 is satisfied, so that the refractive power of the fourth lens, the fifth lens and the sixth lens may be effectively controlled to further contribute to controlling contributions of the three lenses to an aberration of the lens group.

In an exemplary embodiment, the optical imaging lens group according to the disclosure may satisfy 0.2<SAG22/SAG52<0.7, wherein SAG22 is a distance from an intersection point of an image-side surface of the second lens and the optical axis to an effective radius vertex of the image-side surface of the second lens on the optical axis, and SAG52 is a distance from an intersection point of an image-side surface of the fifth lens and the optical axis to an effective radius vertex of the image-side surface of the fifth lens on the optical axis. 0.2<SAG22/SAG52<0.7 is satisfied, so that shapes of the second lens and the fifth lens may be effectively controlled to contribute to the forming and machining of the lenses.

In an exemplary embodiment, the optical imaging lens group according to the disclosure may satisfy 0<Yc61/DT61<1.0, wherein Yc61 is a vertical distance from a point of inflection on an object-side surface of the sixth lens to the optical axis, and DT61 is a maximum effective radius of the object-side surface of the sixth lens. More specifically, Yc61 and DT61 may further satisfy 0.2<Yc61/DT61<1.0. 0<Yc61/DT61<1.0 is satisfied, so that the shape of the sixth lens may be effectively controlled to ensure the machinability of the lens, and in addition, a trend of marginal ray may be effectively controlled to match the lens group and a chip better.

In an exemplary embodiment, the optical imaging lens group according to the disclosure may satisfy 0.3<DT21/DT41<0.8, wherein DT21 is a maximum effective radius of an object-side surface of the second lens, and DT41 is a maximum effective radius of an object-side surface of the fourth lens. More specifically, DT21 and DT41 may further satisfy 0.5<DT21/DT41<0.8. 0.3<DT21/DT41<0.8 is satisfied, so that clear apertures of the second lens and the fourth lens may be effectively controlled to reasonably control an incidence range of incident ray, reject marginal ray with relatively poor quality and reduce an off-axis aberration. In addition, aperture ranges of the second lens and the fourth lens may be reasonably controlled to improve the machinability of the lens group and effectively improve the resolving power of the lens group.

In an exemplary embodiment, the optical imaging lens group according to the disclosure may satisfy 0.3<(R11+R12)/(R6−R10)<2.0, wherein R6 is a curvature radius of an image-side surface of the third lens, R10 is a curvature radius of an image-side surface of the fifth lens, R11 is a curvature radius of an object-side surface of the sixth lens, and R12 is a curvature radius of an image-side surface of the sixth lens. More specifically, R11, R12, R6 and R10 may further satisfy 0.4<(R11+R12)/(R6−R10)<1.5. 0.3<(R11+R12)/(R6−R10)<2.0 is satisfied, so that contributions of the third lens, the fifth lens and the sixth lens to a spherical aberration of the lens group may be effectively controlled to improve the image quality of the lens group.

In an exemplary embodiment, the optical imaging lens group according to the disclosure may satisfy 1.5<CT1/ET1+CT3/ET3<2.0, wherein CT1 is a center thickness of the first lens on the optical axis, CT3 is a center thickness of the third lens on the optical axis, ET1 is an edge thickness of the first lens, and ET3 is an edge thickness of the third lens. More specifically, CT1, ET1, CT3 and ET3 may further satisfy 1.6<CT1/ET1+CT3/ET3<2.0. 1.5<CT1/ET1+CT3/ET3<2.0 is satisfied, so that shapes of the first lens and the third lens may be effectively controlled to ensure the machinability of the lenses, and meanwhile, field curvatures generated by the first lens and the third lens may be balanced to improve the imaging performance of the lens group.

In an exemplary embodiment, the optical imaging lens group according to the disclosure may satisfy 0.2<CT6/CT5<0.7, wherein CT5 is a center thickness of the fifth lens on the optical axis, and CT6 is a center thickness of the sixth lens on the optical axis. More specifically, CT6 and CT5 may further satisfy 0.4<CT6/CT5<0.7. 0.2<CT6/CT5<0.7 is satisfied, so that contributions of the fifth lens and the sixth lens to a field curvature of the lens group may be effectively controlled to further ensure relatively high image quality of the lens group.

In an exemplary embodiment, the optical imaging lens group according to the disclosure may satisfy 0.3<T34/ΣAT<0.8, wherein T34 is a spacing distance of the third lens and the fourth lens on the optical axis, and ΣAT is a sum of spacing distances of any two adjacent lenses in the first lens to the sixth lens on the optical axis. 0.3<T34/ΣAT<0.8 is satisfied, so that the spacing distances between the lenses may be reasonably configured to ensure a relatively low field curvature of the lens group and improve the imaging quality of the lens group.

In an exemplary embodiment, the optical imaging lens group according to the disclosure may satisfy f/EPD<1.7, wherein f is a total effective focal length of the optical imaging lens group, and EPD is an entrance pupil diameter of the optical imaging lens group. f/EPD<1.7 is satisfied, so that a clear aperture of the lens group may be effectively controlled to ensure a relatively high luminous flux of the lens group.

In an exemplary embodiment, the optical imaging lens group according to the disclosure may satisfy TTL/ImgH<1.5, wherein TTL is a distance from an object-side surface of the first lens to an imaging surface of the optical imaging lens group on the optical axis, and ImgH is a half of a diagonal length of an effective pixel region on the imaging surface of the optical imaging lens group. Satisfying TTL/ImgH<1.5 is favorable for achieving miniaturization and ensuring that the lens group is more compact in structure and satisfies a market requirement.

In an exemplary embodiment, the optical imaging lens group according to the disclosure further includes a diaphragm arranged between the object side and the first lens. In an embodiment, the optical imaging lens group may further include an optical filter configured to correct a chromatic aberration and/or a protective glass configured to protect a photosensitive element on the imaging surface. The disclosure provides an optical imaging lens group with the characteristics of small size, large aperture, ultra-thin design, high imaging quality, etc. The optical imaging lens group according to the embodiment of the disclosure may adopt multiple lenses, for example, the above-mentioned six. The refractive power and surface types of each lens, the center thickness of each lens, on-axis spacing distances between the lenses and the like may be reasonably configured to effectively converge incident ray, reduce an optical total length of the lens group and improve the machinability of the imaging lens assembly to make the optical imaging lens group more favorable for production and machining.

In the implementation mode of the disclosure, at least one of mirror surfaces of each lens is an aspheric mirror surface, namely at least one mirror surface in the object-side surface of the first lens to the image-side surface of the sixth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatism aberrations during imaging may be eliminated as much as possible, thereby improving the imaging quality. In an embodiment, at least one of the object-side surface and the image-side surface of each lens in the first lens, the second lens, the third lens, the fourth lens, the fifth lens and the sixth lens is an aspheric mirror surface. In another embodiment, both the object-side surface and the image-side surface of each lens in the first lens, the second lens, the third lens, the fourth lens, the fifth lens and the sixth lens are aspheric mirror surfaces.

However, those skilled in the art should know that the number of the lenses forming the optical imaging lens group may be changed without departing from the technical solutions claimed in the disclosure to achieve each result and advantage described in the specification. For example, although descriptions are made in the embodiment with six lenses as an example, the optical imaging lens group is not limited to six lenses. If necessary, the optical imaging lens group may also include another number of lenses.

Specific embodiments applied to the optical imaging lens group of the above-mentioned embodiment will further be described below with reference to the drawings.

Embodiment 1

An optical imaging lens group according to Embodiment 1 of the disclosure will be described below with reference to FIGS. 1-2D. FIG. 1 shows a structural schematic diagram of an optical imaging lens group according to Embodiment 1 of the disclosure.

As shown in FIG. 1, the optical imaging lens group sequentially includes from an object side to an image side: a diaphragm STO, a first lens E1, a second lens E2, a third lens E3, a fourth lens E4, a fifth lens E5, a sixth lens E6, an optical filter E7 and an imaging surface S15.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

Table 1 shows a basic parameter table of the optical imaging lens group of Embodiment 1, wherein the units of the curvature radius, the thickness/distance and the focal length are all millimeters (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | 400.0000 | | | | |
| STO | Spherical | Infinite | −0.0353 | | | | |
| S1 | Aspheric | 1.7439 | 0.2100 | 1.65 | 23.5 | −36.91 | −0.7727 |
| S2 | Aspheric | 1.5481 | 0.0860 | | | | 0.0000 |
| S3 | Aspheric | 3.4655 | 0.6272 | 1.55 | 56.1 | 2.08 | 0.0000 |
| S4 | Aspheric | −1.5820 | 0.0300 | | | | 0.0000 |
| S5 | Aspheric | 2.6309 | 0.2300 | 1.67 | 20.4 | −4.74 | 0.0000 |
| S6 | Aspheric | 1.3853 | 0.5417 | | | | 0.0000 |
| S7 | Aspheric | −6.9425 | 0.2770 | 1.57 | 38.0 | −11.62 | 0.0000 |
| S8 | Aspheric | 149.2222 | 0.0904 | | | | 98.0000 |
| S9 | Aspheric | 14.3685 | 0.6779 | 1.55 | 56.1 | 2.91 | 0.0000 |
| S10 | Aspheric | −1.7573 | 0.0497 | | | | −1.0000 |
| S11 | Aspheric | 0.8785 | 0.3304 | 1.54 | 55.9 | −3.60 | −1.0000 |
| S12 | Aspheric | 0.5247 | 0.6173 | | | | −1.0000 |
| S13 | Spherical | Infinite | 0.1100 | 1.52 | 64.2 | | |

TABLE 1-continued

| Surface number | Surface type | Curvature radius | Thickness/ distance | Material Refractive index | Material Abbe number | Focal length | Conic coefficient |
|---|---|---|---|---|---|---|---|
| S14 | Spherical | Infinite | 0.2560 | | | | |
| S15 | Spherical | Infinite | | | | | |

In the embodiment, a total effective focal length f of the optical imaging lens group is 2.85 mm. TTL is a total length of the optical imaging lens group (i.e., a distance from the object-side surface S1 of the first lens E1 to the imaging surface S15 of the optical imaging lens group on an optical axis), and TTL is 4.13 mm. ImgH is a half of a diagonal length of an effective pixel region on the imaging surface S15 of the optical imaging lens group, and ImgH is 3.04 mm. f/EPD is a ratio of the total effective focal length f of the optical imaging lens group to an Entrance Pupil Diameter (EPD) of the optical imaging lens group, and f/EPD is 1.65. Semi-FOV is a half of a maximum field of view of the optical imaging lens group, and Semi-FOV is 46.2°.

In Embodiment 1, both the object-side surface and the image-side surface of any lens in the first lens E1 to the sixth lens E6 are aspheric surfaces, and a surface type x of each aspheric lens may be defined through, but not limited to, the following aspheric surface formula:

$$x = \frac{ch^2}{1 + \sqrt{1 - (k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface. Tables 2-1 and 2-2 show higher-order coefficients A4, A6, A8, A10, A12, A14, A16, A18, A20, A22, A24, A26, A28 and A30 that can be used for each of the aspheric mirror surfaces S1-S12 in Embodiment 1.

TABLE 2-1

| Surface number | A4 | A6 | A8 | A10 | A12 | A14 | A16 |
|---|---|---|---|---|---|---|---|
| S1 | −1.6125E−01 | 9.2362E−01 | −1.8338E+01 | 1.8701E+02 | −1.2507E+03 | 5.7368E+03 | −1.8491E+04 |
| S2 | −8.1469E−02 | −3.2259E−01 | −1.5630E+00 | 4.7882E+01 | −5.2543E+02 | 3.4557E+03 | −1.5099E+04 |
| S3 | 9.1067E−02 | −9.0325E−01 | 1.3815E+01 | −1.2977E+02 | 7.9514E+02 | −3.2659E+03 | 9.1922E+03 |
| S4 | 7.7162E−01 | −6.6282E+00 | 4.7357E+01 | −2.5627E+02 | 1.0350E+03 | −3.1009E+03 | 6.8760E+03 |
| S5 | 4.2456E−01 | −4.2651E+00 | 2.6663E+01 | −1.2141E+02 | 4.0263E+02 | −9.6607E+02 | 1.6543E+03 |
| S6 | −2.2244E−01 | 3.2002E−01 | −4.0308E+00 | −4.4745E+01 | 3.8782E+01 | −1.6468E+02 | 4.5145E+02 |
| S7 | 2.1230E−01 | −1.2968E+00 | −1.1892E+01 | 1.6098E+02 | −8.8307E+02 | 2.9666E+03 | −6.7739E+03 |
| S8 | 1.9221E+00 | −1.3878E+01 | 4.9835E+01 | −1.0821E+02 | 1.3002E+02 | −1.9604E+01 | −2.2790E+02 |
| S9 | 2.1743E+00 | −1.2031E+01 | 3.9873E+01 | −9.1772E+01 | 1.5287E+02 | −1.8746E+02 | 1.7047E+02 |
| S10 | 4.7003E−01 | −2.3750E+00 | 6.5914E+00 | −1.2382E+01 | 1.7220E+01 | −1.7693E+01 | 1.3308E+01 |
| S11 | −9.9549E−01 | −1.6126E+00 | 6.9398E+00 | −1.0957E+01 | 1.0350E+01 | −6.4374E+00 | 2.7008E+00 |
| S12 | −1.8201E+00 | 2.6167E+00 | −2.8266E+00 | 2.3442E+00 | −1.5113E+00 | 7.5598E−01 | −2.9084E−01 |

TABLE 2-2

| Surface number | A18 | A20 | A22 | A24 | A26 | A28 | A30 |
|---|---|---|---|---|---|---|---|
| S1 | 4.2294E+04 | −6.8341E+04 | 7.6326E+04 | −5.6086E+04 | 2.4404E+04 | −4.7635E+03 | 0.0000E+00 |
| S2 | 4.5559E+04 | −9.6300E+04 | 1.4225E+05 | −1.4384E+05 | 9.4860E+04 | −3.6763E+04 | 6.3508E+03 |
| S3 | −1.7918E+04 | 2.4048E+04 | −2.1594E+04 | 1.2081E+04 | −3.4715E+03 | 1.2230E+02 | 1.2705E+02 |
| S4 | −1.1217E+04 | 1.3278E+04 | −1.1110E+04 | 6.2698E+03 | −2.1862E+03 | 3.8961E+02 | −1.9175E+01 |
| S5 | −1.9570E+03 | 1.4679E+03 | −4.9628E+02 | −1.9451E+02 | 2.9536E+02 | −1.2879E+02 | 2.1001E+01 |
| S6 | −8.5681E+02 | 1.1502E+03 | −1.0900E+03 | 7.1360E+02 | −3.0698E+02 | 7.8051E+01 | −8.8823E+00 |
| S7 | 1.0947E+04 | −1.2688E+04 | 1.0497E+04 | −6.0549E+03 | 2.3141E+03 | −5.2667E+02 | 5.4024E+01 |
| S8 | 4.5343E+02 | −4.8533E+02 | 3.3484E+02 | −1.5306E+02 | 4.4952E+01 | −7.6958E+00 | 5.8422E−01 |
| S9 | −1.1501E+02 | 5.7174E+01 | −2.0608E+01 | 5.2250E+00 | −8.8190E−01 | 8.8836E−02 | −4.0364E−03 |
| S10 | −7.3020E+00 | 2.9079E+00 | −8.2949E−01 | 1.6487E−01 | −2.1652E−02 | 1.6867E−03 | −5.8965E−05 |
| S11 | −7.5194E−01 | 1.2747E−01 | −8.5351E−03 | −1.2805E−03 | 3.6132E−04 | −3.4342E−05 | 1.2451E−06 |
| S12 | 8.5048E−02 | −1.8620E−02 | 2.9878E−03 | −3.3981E−04 | 2.5875E−05 | −1.1810E−06 | 2.4396E−08 |

Figure 2A:
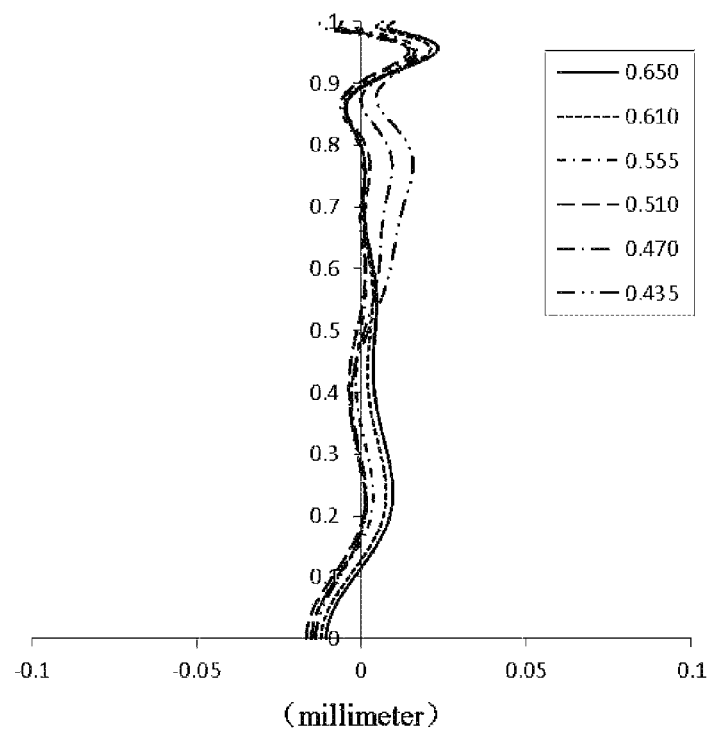
FIGS. 2A-2D show a longitudinal aberration curve, an astigmatism curve, a distortion curve and a lateral color curve of an optical imaging lens group according to Embodiment 1 respectively.
Figure 2B:
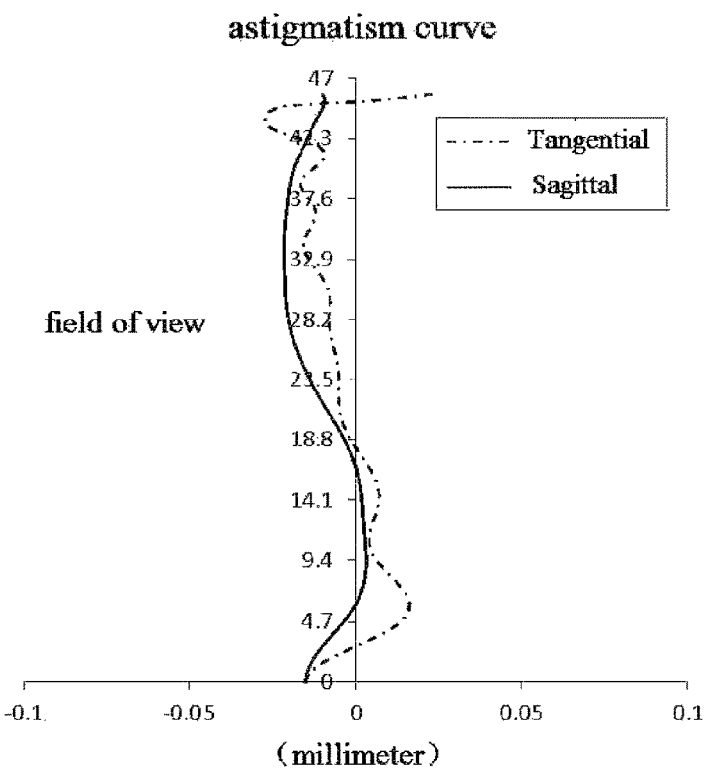
Figure 2C:
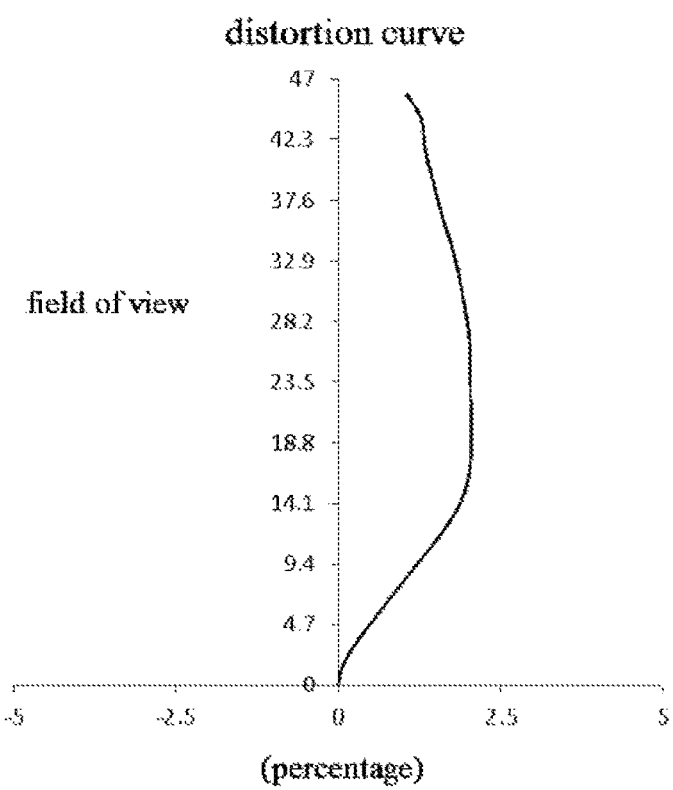
Figure 2D:
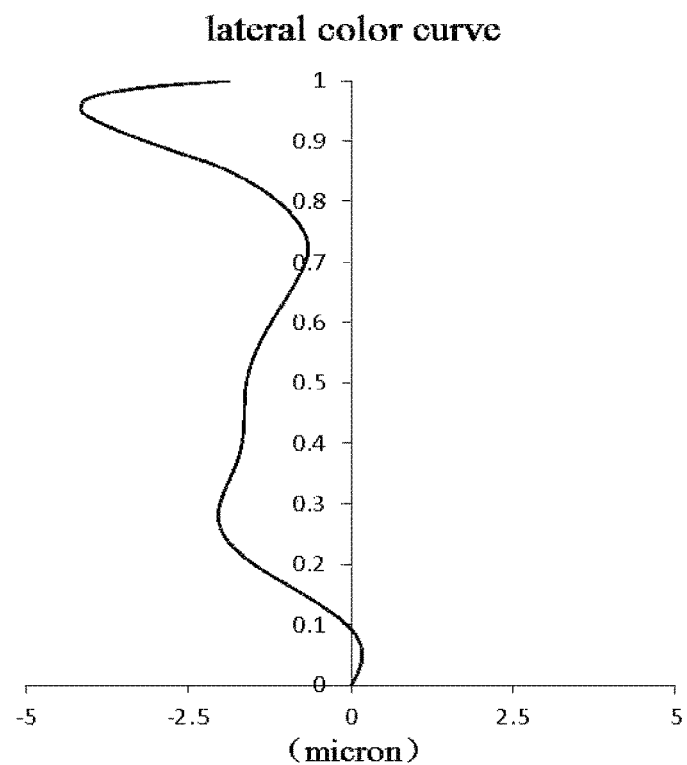

FIG. 2A shows a longitudinal aberration curve of the optical imaging lens group according to Embodiment 1 to represent deviations of a convergence focal point after light with different wavelengths passes through the lens. FIG. 2B shows an astigmatism curve of the optical imaging lens group according to Embodiment 1 to represent a tangential image surface curvature and a sagittal image surface curvature. FIG. 2C shows a distortion curve of the optical imaging lens group according to Embodiment 1 to represent distortion values corresponding to different fields of view. FIG. 2D shows a lateral color curve of the optical imaging lens group according to Embodiment 1 to represent deviations of different image heights on the imaging surface after the light passes through the lens. According to FIGS. 2A-2D, it can be seen that the optical imaging lens group provided in Embodiment 1 may achieve high imaging quality.

Embodiment 2

Figure 3:
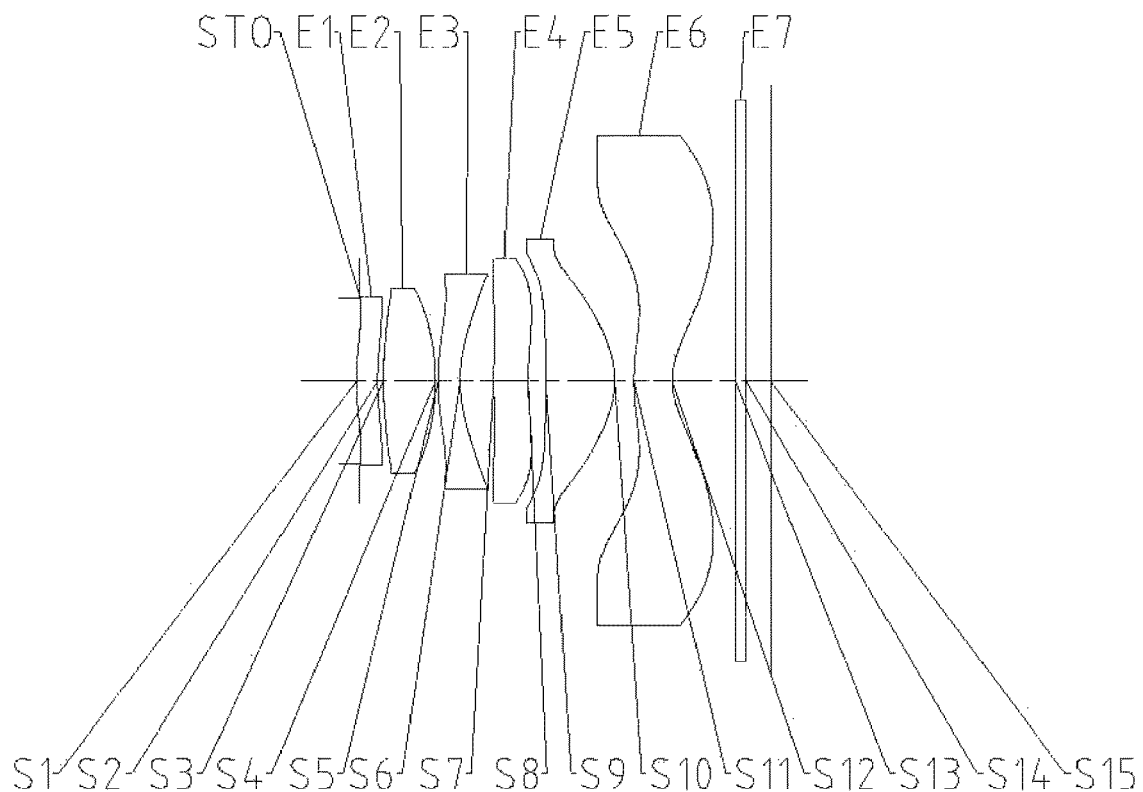
FIG. 3 shows a structural schematic diagram of an optical imaging lens group according to Embodiment 2 of the disclosure.

An optical imaging lens group according to Embodiment 2 of the disclosure will be described below with reference to FIGS. 3-4D. In the embodiment and the following embodiments, parts of descriptions similar to those about Embodiment 1 are omitted for simplicity. FIG. 3 shows a structural schematic diagram of an optical imaging lens group according to Embodiment 2 of the disclosure.

As shown in FIG. 3, the optical imaging lens group sequentially includes from an object side to an image side: a diaphragm STO, a first lens E1, a second lens E2, a third lens E3, a fourth lens E4, a fifth lens E5, a sixth lens E6, an optical filter E7 and an imaging surface S15.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens group is 2.81 mm. TTL is a total length of the optical imaging lens group, and TTL is 4.30 mm. ImgH is a half of a diagonal length of an effective pixel region on the imaging surface S15 of the optical imaging lens group, and ImgH is 3.04 mm. f/EPD is a ratio of the total effective focal length f of the optical imaging lens group to an Entrance Pupil Diameter (EPD) of the optical imaging lens group, and f/EPD is 1.64. Semi-FOV is a half of a maximum field of view of the optical imaging lens group, and Semi-FOV is 46.4°.

Table 3 shows a basic parameter table of the optical imaging lens group of Embodiment 2, wherein the units of the curvature radius, the thickness/distance and the focal length are all millimeters (mm). Tables 4-1 and 4-2 show high-order coefficients that can be used for each aspheric mirror surface in Embodiment 2. A surface type of each aspheric surface may be defined by formula (1) given in Embodiment 1.

TABLE 3

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 400.0000 | | | | |
| STO | Spherical | Infinite | −0.0357 | | | | |
| S1 | Aspheric | 2.8973 | 0.2211 | 1.65 | 23.5 | −60.12 | 1.4200 |
| S2 | Aspheric | 2.6151 | 0.0605 | | | | 0.0894 |
| S3 | Aspheric | 3.3973 | 0.5382 | 1.55 | 56.1 | 2.52 | 0.0000 |
| S4 | Aspheric | −2.1765 | 0.0300 | | | | 0.0000 |
| S5 | Aspheric | 2.6439 | 0.2300 | 1.67 | 20.4 | −5.00 | 0.0000 |
| S6 | Aspheric | 1.4225 | 0.3487 | | | | 0.0000 |
| S7 | Aspheric | 5.9101 | 0.3558 | 1.57 | 38.0 | −12.70 | 0.0000 |
| S8 | Aspheric | 3.1837 | 0.1814 | | | | 0.0000 |
| S9 | Aspheric | −17.5220 | 0.7084 | 1.55 | 56.1 | 1.75 | 0.0000 |
| S10 | Aspheric | −0.9183 | 0.2022 | | | | −1.0000 |
| S11 | Aspheric | 2.5523 | 0.4017 | 1.54 | 55.9 | −2.13 | 0.0000 |
| S12 | Aspheric | 0.7456 | 0.6560 | | | | −1.0000 |
| S13 | Spherical | Infinite | 0.1100 | 1.52 | 64.2 | | |
| S14 | Spherical | Infinite | 0.2560 | | | | |
| S15 | Spherical | Infinite | | | | | |

TABLE 4-1

| Surface number | A4 | A6 | A8 | A10 | A12 | A14 | A16 |
|---|---|---|---|---|---|---|---|
| S1 | −1.8573E−01 | 3.4259E−01 | −2.9154E+00 | 1.3589E+01 | −3.9198E+01 | 7.1061E+01 | −7.8491E+01 |
| S2 | −2.3700E−01 | −3.0090E−01 | 3.0978E+00 | −1.6916E+01 | 5.6764E+01 | −1.1277E+02 | 1.3114E+02 |
| S3 | −1.1473E−01 | −8.9141E−02 | 7.1259E−01 | −3.7390E+00 | 1.3938E+01 | −2.7950E+01 | 3.0489E+01 |
| S4 | 1.3033E−01 | −4.1803E−01 | 5.7481E−01 | −1.7475E−01 | −1.0719E+00 | 2.5795E+00 | −3.0619E+00 |
| S5 | −1.2455E−01 | 2.7501E−01 | −1.7272E+00 | 5.4993E+00 | −1.0793E+01 | 1.3378E+01 | −1.0158E+01 |
| S6 | −3.2268E−01 | 7.6477E−01 | −2.2450E+00 | 4.5805E+00 | −6.3819E+00 | 5.8984E+00 | −3.4321E+00 |
| S7 | −2.3229E−01 | 1.5298E−01 | 4.5194E−01 | −1.9112E+00 | 3.6405E+00 | −4.0139E+00 | 2.6010E+00 |

TABLE 4-1-continued

| Surface number | A4 | A6 | A8 | A10 | A12 | A14 | A16 |
|---|---|---|---|---|---|---|---|
| S8 | −1.6268E−01 | −4.4877E−01 | 2.4183E+00 | −6.7597E+00 | 1.2568E+01 | −1.6475E+01 | 1.5255E+01 |
| S9 | 1.0564E−01 | −3.8124E−01 | 1.2426E−01 | 1.8861E+00 | −5.9156E+00 | 9.3290E+00 | −9.1836E+00 |
| S10 | 5.1360E−01 | −1.4182E+00 | 3.1385E+00 | −5.2837E+00 | 6.6312E+00 | −6.0427E+00 | 3.8686E+00 |
| S11 | 3.6060E−02 | −1.1837E+00 | 2.8085E+00 | −3.9789E+00 | 3.8058E+00 | −2.5614E+00 | 1.2367E+00 |
| S12 | −7.0224E−01 | 6.5530E−01 | −4.8449E−01 | 2.6377E−01 | −1.0480E−01 | 3.0410E−02 | −6.4269E−03 |

TABLE 4-2

| Surface number | A18 | A20 | A22 | A24 | A26 | A28 | A30 |
|---|---|---|---|---|---|---|---|
| S1 | 4.8246E+01 | −1.2666E+01 | 0.0000E+00 | 0.0000E+00 | 0.0000E+00 | 0.0000E+00 | 0.0000E+00 |
| S2 | −8.2834E+01 | 2.1955E+01 | 0.0000E+00 | 0.0000E+00 | 0.0000E+00 | 0.0000E+00 | 0.0000E+00 |
| S3 | −1.7276E+01 | 3.9855E+00 | 0.0000E+00 | 0.0000E+00 | 0.0000E+00 | 0.0000E+00 | 0.0000E+00 |
| S4 | 1.9775E+00 | −5.4288E−01 | 0.0000E+00 | 0.0000E+00 | 0.0000E+00 | 0.0000E+00 | 0.0000E+00 |
| S5 | 4.3154E+00 | −7.8523E−01 | 0.0000E+00 | 0.0000E+00 | 0.0000E+00 | 0.0000E+00 | 0.0000E+00 |
| S6 | 1.1305E+00 | −1.6003E−01 | 0.0000E+00 | 0.0000E+00 | 0.0000E+00 | 0.0000E+00 | 0.0000E+00 |
| S7 | −9.1656E−01 | 1.3492E−01 | 0.0000E+00 | 0.0000E+00 | 0.0000E+00 | 0.0000E+00 | 0.0000E+00 |
| S8 | −9.7220E+00 | 4.0315E+00 | −9.7243E−01 | 1.0288E−01 | 0.0000E+00 | 0.0000E+00 | 0.0000E+00 |
| S9 | 5.9852E+00 | −2.6108E+00 | 7.4614E−01 | −1.2947E−01 | 1.0602E−02 | 0.0000E+00 | 0.0000E+00 |
| S10 | −1.6663E+00 | 4.5407E−01 | −6.8803E−02 | 3.1636E−03 | 5.7218E−04 | −7.5334E−05 | 0.0000E+00 |
| S11 | −4.3051E−01 | 1.0714E−01 | −1.8584E−02 | 2.1324E−03 | −1.4531E−04 | 4.4456E−06 | 0.0000E+00 |
| S12 | 9.7651E−04 | −1.0357E−04 | 7.2416E−06 | −2.9780E−07 | 5.3989E−09 | 0.0000E+00 | 0.0000E+00 |

Figure 4A:
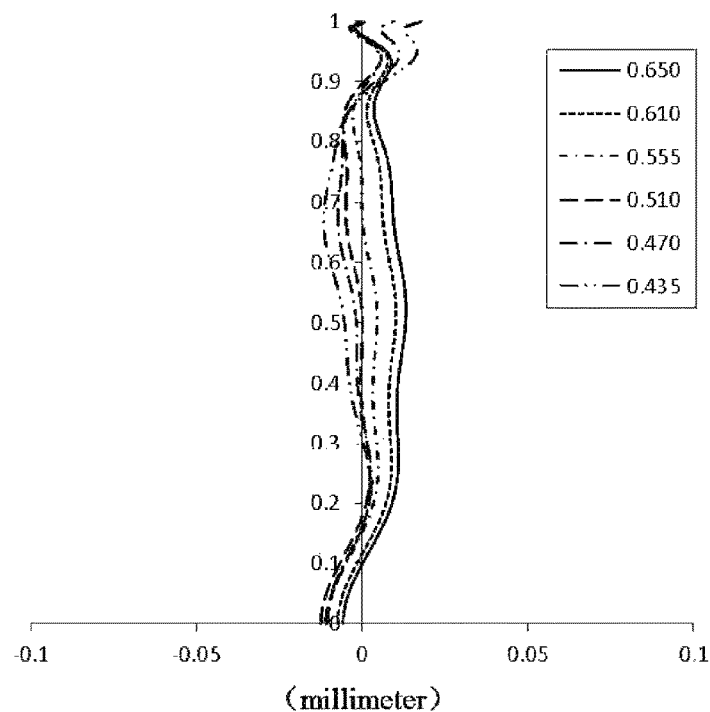
FIGS. 4A-4D show a longitudinal aberration curve, an astigmatism curve, a distortion curve and a lateral color curve of an optical imaging lens group according to Embodiment 2 respectively.
Figure 4B:
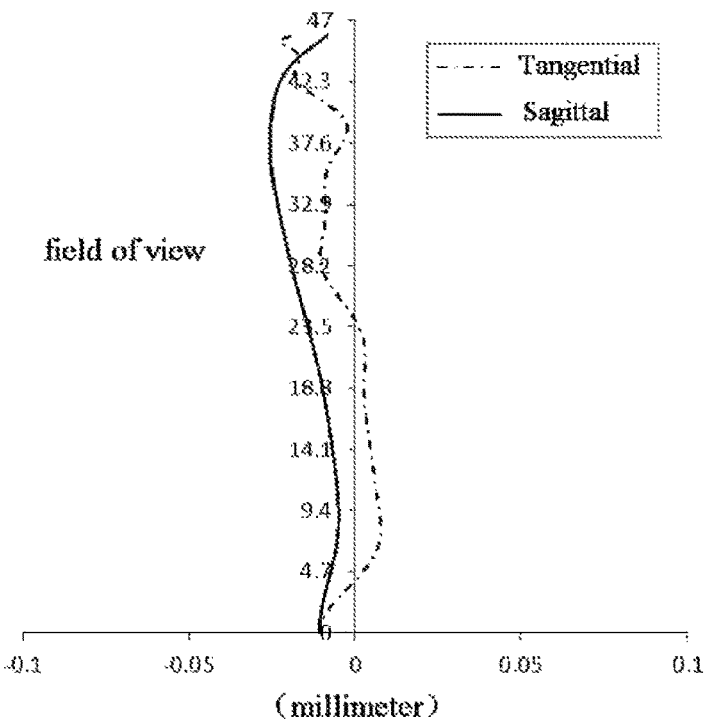
Figure 4C:
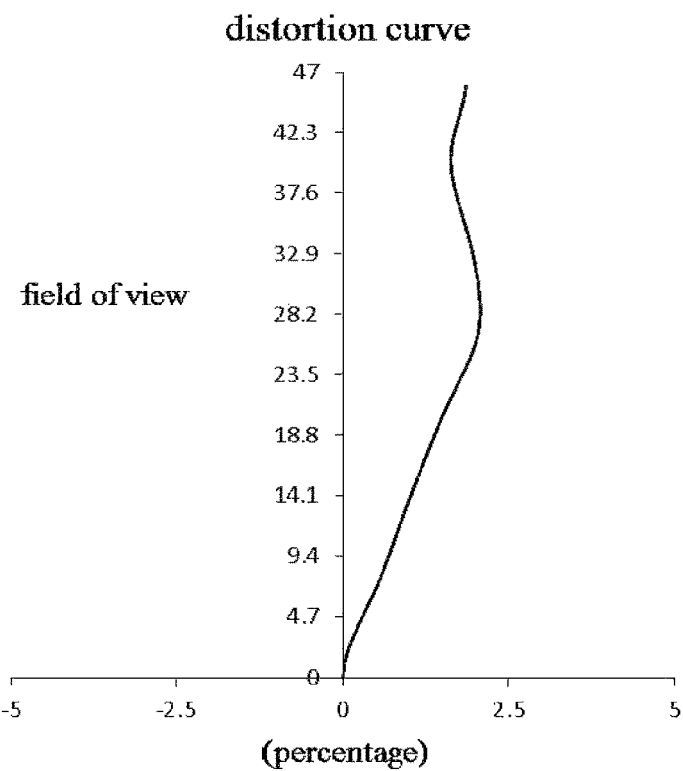
Figure 4D:
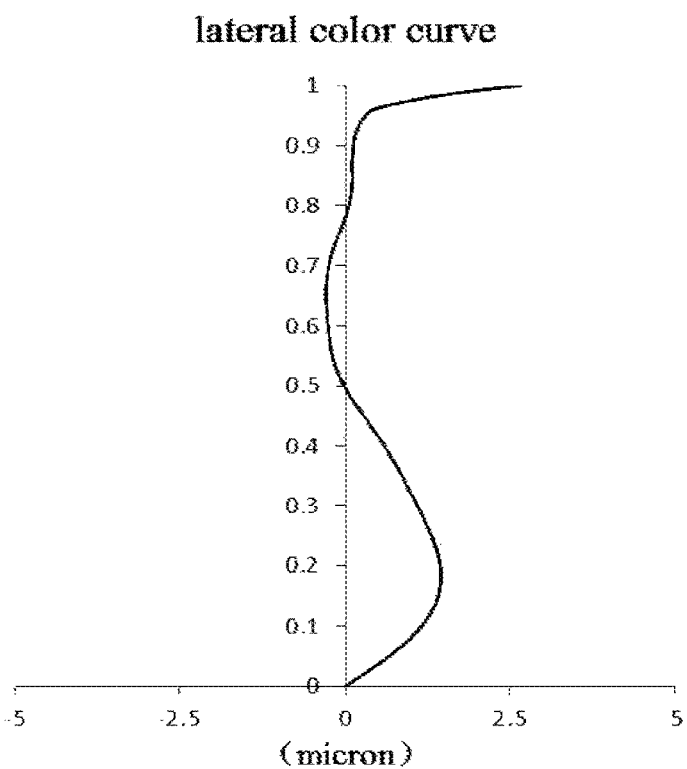

FIG. 4A shows a longitudinal aberration curve of the optical imaging lens group according to Embodiment 2 to represent deviations of a convergence focal point after light with different wavelengths passes through the lens. FIG. 4B shows an astigmatism curve of the optical imaging lens group according to Embodiment 2 to represent a tangential image surface curvature and a sagittal image surface curvature. FIG. 4C shows a distortion curve of the optical imaging lens group according to Embodiment 2 to represent distortion values corresponding to different fields of view. FIG. 4D shows a lateral color curve of the optical imaging lens group according to Embodiment 2 to represent deviations of different image heights on the imaging surface after the light passes through the lens. According to FIGS. 4A-4D, it can be seen that the optical imaging lens group provided in Embodiment 2 may achieve high imaging quality.

Embodiment 3

Figures 5, 6A:
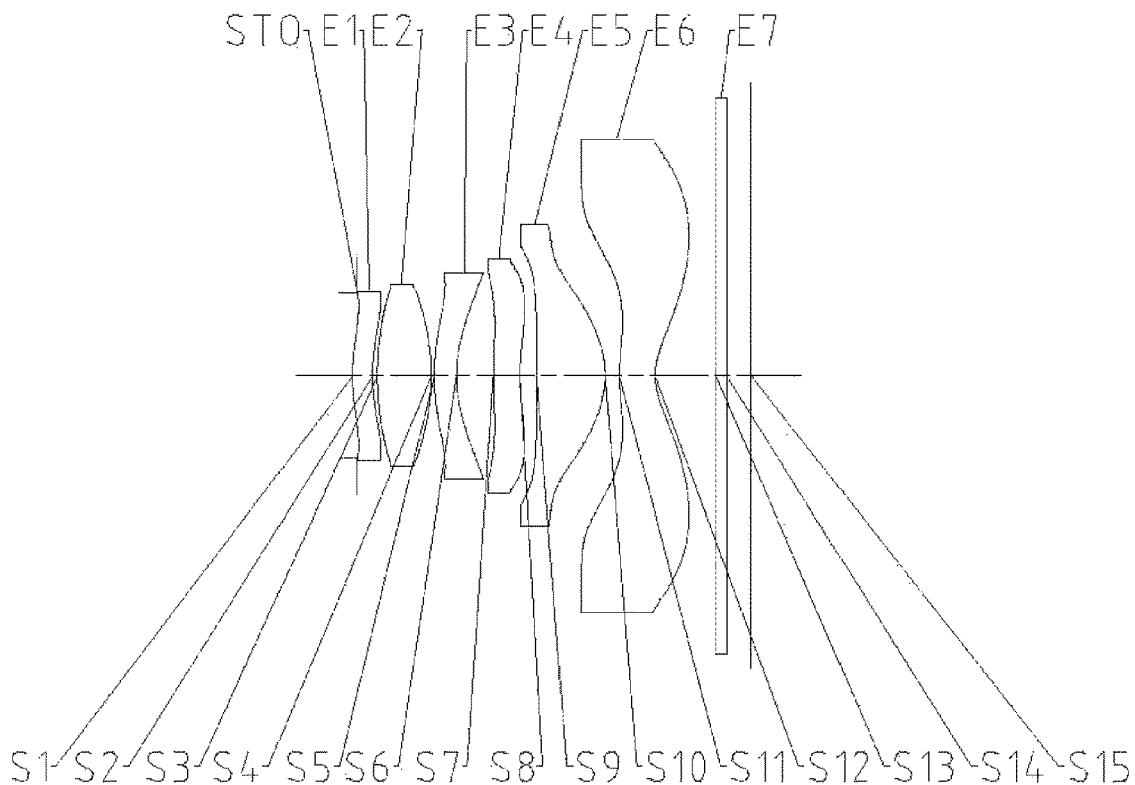
FIG. 5 shows a structural schematic diagram of an optical imaging lens group according to Embodiment 3 of the disclosure.
FIGS. 6A-6D show a longitudinal aberration curve, an astigmatism curve, a distortion curve and a lateral color curve of an optical imaging lens group according to Embodiment 3 respectively.
Figure 6B:
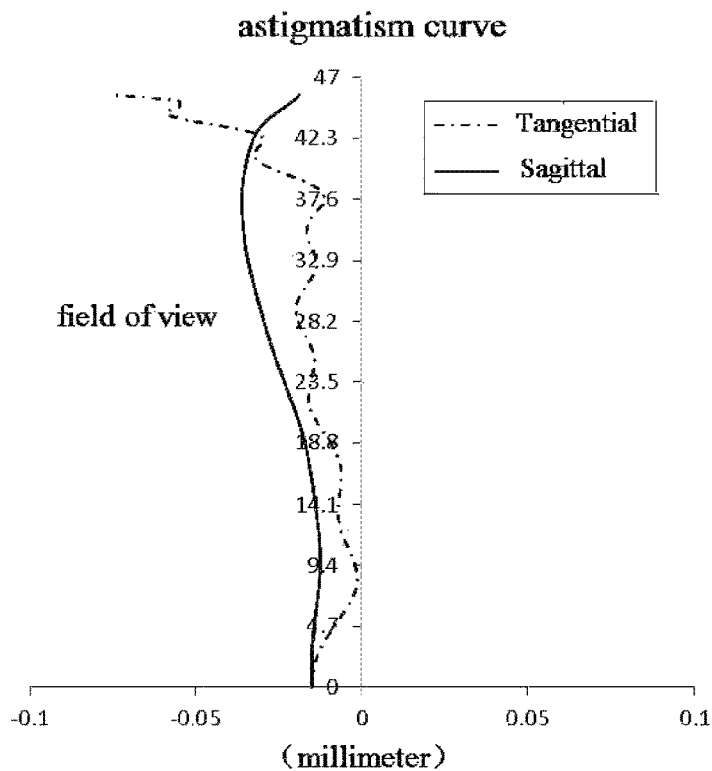
Figure 6C:
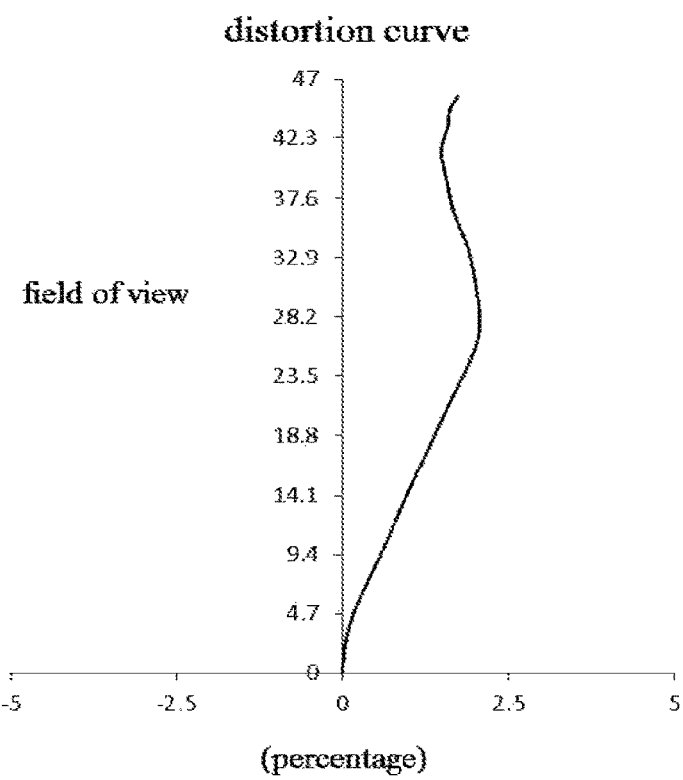
Figure 6D:
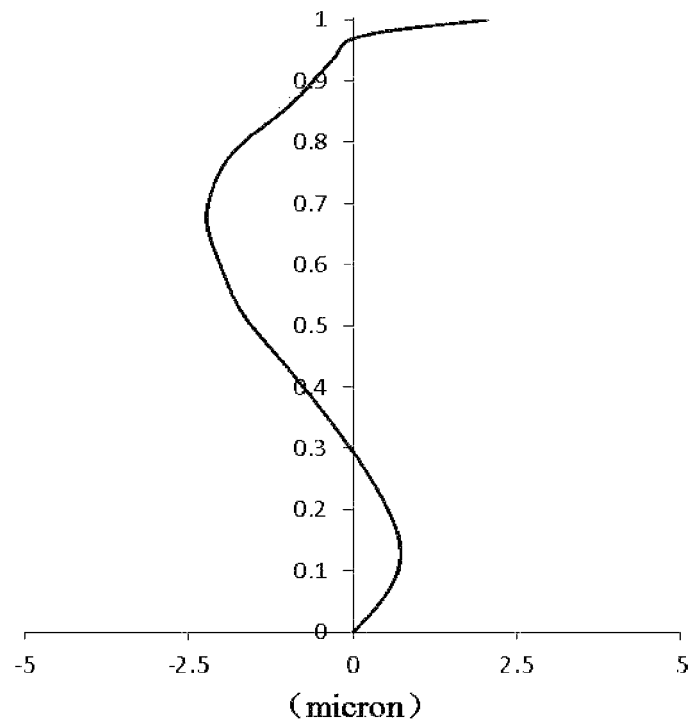

An optical imaging lens group according to Embodiment 3 of the disclosure is described below with reference to FIGS. 5-6D. FIG. 5 shows a structural schematic diagram of an optical imaging lens group according to Embodiment 3 of the disclosure.

As shown in FIG. 5, the optical imaging lens group sequentially includes from an object side to an image side: a diaphragm STO, a first lens E1, a second lens E2, a third lens E3, a fourth lens E4, a fifth lens E5, a sixth lens E6, an optical filter E7 and an imaging surface S15.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface 511 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens group is 2.83 mm. TTL is a total length of the optical imaging lens group, and TTL is 4.15 mm. ImgH is a half of a diagonal length of an effective pixel region on the imaging surface S15 of the optical imaging lens group, and ImgH is 3.04 mm. f/EPD is a ratio of the total effective focal length f of the optical imaging lens group to an Entrance Pupil Diameter (EPD) of the optical imaging lens group, and f/EPD is 1.64. Semi-FOV is a half of a maximum field of view of the optical imaging lens group, and Semi-FOV is 46.1°.

Table 5 shows a basic parameter table of the optical imaging lens group of Embodiment 3, wherein the units of the curvature radius, the thickness/distance and the focal length are all millimeters (mm). Tables 6-1 and 6-2 show high-order coefficients that can be used for each aspheric mirror surface in Embodiment 3. A surface type of each aspheric surface may be defined by formula (1) given in Embodiment 1.

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 400.0000 | | | | |
| STO | Spherical | Infinite | −0.0487 | | | | |
| S1 | Aspheric | 2.1660 | 0.2100 | 1.65 | 23.5 | −52.84 | −0.5615 |
| S2 | Aspheric | 1.9591 | 0.0499 | | | | −1.2585 |
| S3 | Aspheric | 3.3577 | 0.5623 | 1.55 | 56.1 | 2.38 | 0.0000 |
| S4 | Aspheric | −1.9963 | 0.0300 | | | | 0.0000 |
| S5 | Aspheric | 2.4796 | 0.2300 | 1.67 | 20.4 | −5.25 | 0.0000 |
| S6 | Aspheric | 1.3979 | 0.3855 | | | | 0.0000 |
| S7 | Aspheric | 4.1482 | 0.2770 | 1.57 | 38.0 | −9.60 | 0.0000 |
| S8 | Aspheric | 2.3031 | 0.1715 | | | | 0.0000 |
| S9 | Aspheric | 560.0000 | 0.7125 | 1.55 | 56.1 | 1.70 | −98.0000 |
| S10 | Aspheric | −0.9313 | 0.1466 | | | | −1.0000 |
| S11 | Aspheric | 2.2776 | 0.3722 | 1.54 | 55.9 | −1.97 | 0.0000 |
| S12 | Aspheric | 0.6805 | 0.6365 | | | | −1.0000 |
| S13 | Spherical | Infinite | 0.1100 | 1.52 | 64.2 | | |
| S14 | Spherical | Infinite | 0.2560 | | | | |
| S15 | Spherical | Infinite | | | | | |

TABLE 6-1

| Surface number | A4 | A6 | A8 | A10 | A12 | A14 | A16 |
|---|---|---|---|---|---|---|---|
| S1 | −2.2451E−01 | 1.2498E+00 | −1.6833E+01 | 1.2959E+02 | −6.4443E+02 | 2.1296E+03 | −4.7117E+03 |
| S2 | −1.0054E−01 | −2.3609E+00 | 3.8190E+01 | −3.7786E+02 | 2.4334E+03 | −1.0667E+04 | 3.2653E+04 |
| S3 | 1.3635E−02 | −8.6431E−01 | 1.5104E+01 | −1.4548E+02 | 8.9926E+02 | −3.7523E+03 | 1.0883E+04 |
| S4 | 3.1440E−01 | −2.5065E+00 | 2.3913E+01 | −1.8025E+02 | 9.7316E+02 | −3.7296E+03 | 1.0186E+04 |
| S5 | 1.7407E−02 | −9.0742E−01 | 7.9962E+00 | −5.0444E+01 | 2.1819E+02 | −6.6299E+02 | 1.4349E+03 |
| S6 | −3.2261E−01 | 8.5452E−01 | −2.6365E+00 | 5.5401E+00 | −6.7542E+00 | 1.4612E−01 | 1.5993E+01 |
| S7 | −3.6651E−01 | 1.0312E+00 | −9.2040E+00 | 7.1274E+01 | −3.6196E+02 | 1.2456E+03 | −3.0122E+03 |
| S8 | −2.9048E−01 | −4.4075E−01 | 4.1069E+00 | −1.8046E+01 | 5.9512E+01 | −1.5359E+02 | 3.0348E+02 |
| S9 | 8.7894E−02 | −4.1456E−01 | −8.6322E−01 | 1.1994E+01 | −5.1286E+01 | 1.3407E+02 | −2.4041E+02 |
| S10 | 4.3081E−01 | −1.0326E+00 | 1.2634E+00 | 1.7286E+00 | −1.1213E+01 | 2.5343E+01 | −3.5183E+01 |
| S11 | −3.1099E−01 | −7.4803E−01 | 3.0975E+00 | −5.9710E+00 | 7.4282E+00 | −6.4537E+00 | 4.0477E+00 |
| S12 | −1.1228E+00 | 1.6806E+00 | −2.1490E+00 | 2.1625E+00 | −1.6640E+00 | 9.6573E−01 | −4.1981E−01 |

TABLE 6-2

| Surface number | A18 | A20 | A22 | A24 | A26 | A28 | A30 |
|---|---|---|---|---|---|---|---|
| S1 | 6.8896E+03 | −6.3812E+03 | 3.3880E+03 | −7.8488E+02 | 0.0000E+00 | 0.0000E+00 | 0.0000E+00 |
| S2 | −7.0507E+04 | 1.0696E+05 | −1.1156E+05 | 7.6199E+04 | −3.0697E+04 | 5.5307E+03 | 0.0000E+00 |
| S3 | −2.2231E+04 | 3.1907E+04 | −3.1531E+04 | 2.0448E+04 | −7.8398E+03 | 1.3478E+03 | 0.0000E+00 |
| S4 | −1.9819E+04 | 2.7202E+04 | −2.5691E+04 | 1.5871E+04 | −5.7687E+03 | 9.3496E+02 | 0.0000E+00 |
| S5 | −2.2188E+03 | 2.4303E+03 | −1.8405E+03 | 9.1643E+02 | −2.7006E+02 | 3.5722E+01 | 0.0000E+00 |
| S6 | −3.0656E+01 | 3.0277E+01 | −1.7272E+01 | 5.3637E+00 | −6.9840E−01 | 0.0000E+00 | 0.0000E+00 |
| S7 | 5.2226E+03 | −6.5280E+03 | 5.8349E+03 | −3.6375E+03 | 1.5020E+03 | −3.6913E+02 | 4.0855E+01 |
| S8 | −4.4935E+02 | 4.9018E+02 | −3.8648E+02 | 2.1370E+02 | −7.8525E+01 | 1.7210E+01 | −1.7018E+00 |
| S9 | 3.0693E+02 | −2.8185E+02 | 1.8484E+02 | −8.4416E+01 | 2.5483E+01 | −4.5649E+00 | 3.6694E−01 |
| S10 | 3.3231E+01 | −2.1984E+01 | 1.0188E+01 | −3.2378E+00 | 6.7198E−01 | −8.2015E−02 | 4.4649E−03 |
| S11 | −1.8582E+00 | 6.2537E−01 | −1.5269E−01 | 2.6351E−02 | −3.0508E−03 | 2.1281E−04 | −6.7654E−06 |
| S12 | 1.3588E−01 | −3.2439E−02 | 5.6173E−03 | −6.8455E−04 | 5.5574E−05 | −2.6949E−06 | 5.8999E−08 |

FIG. 6A shows a longitudinal aberration curve of the optical imaging lens group according to Embodiment 3 to represent deviations of a convergence focal point after light with different wavelengths passes through the lens. FIG. 6B shows an astigmatism curve of the optical imaging lens group according to Embodiment 3 to represent a tangential image surface curvature and a sagittal image surface curvature. FIG. 6C shows a distortion curve of the optical imaging lens group according to Embodiment 3 to represent distortion values corresponding to different fields of view. FIG. 6D shows a lateral color curve of the optical imaging lens group according to Embodiment 3 to represent deviations of different image heights on the imaging surface after the light passes through the lens. According to FIGS. 6A-6D, it can be seen that the optical imaging lens group provided in Embodiment 3 may achieve high imaging quality.

Embodiment 4

Figure 7:
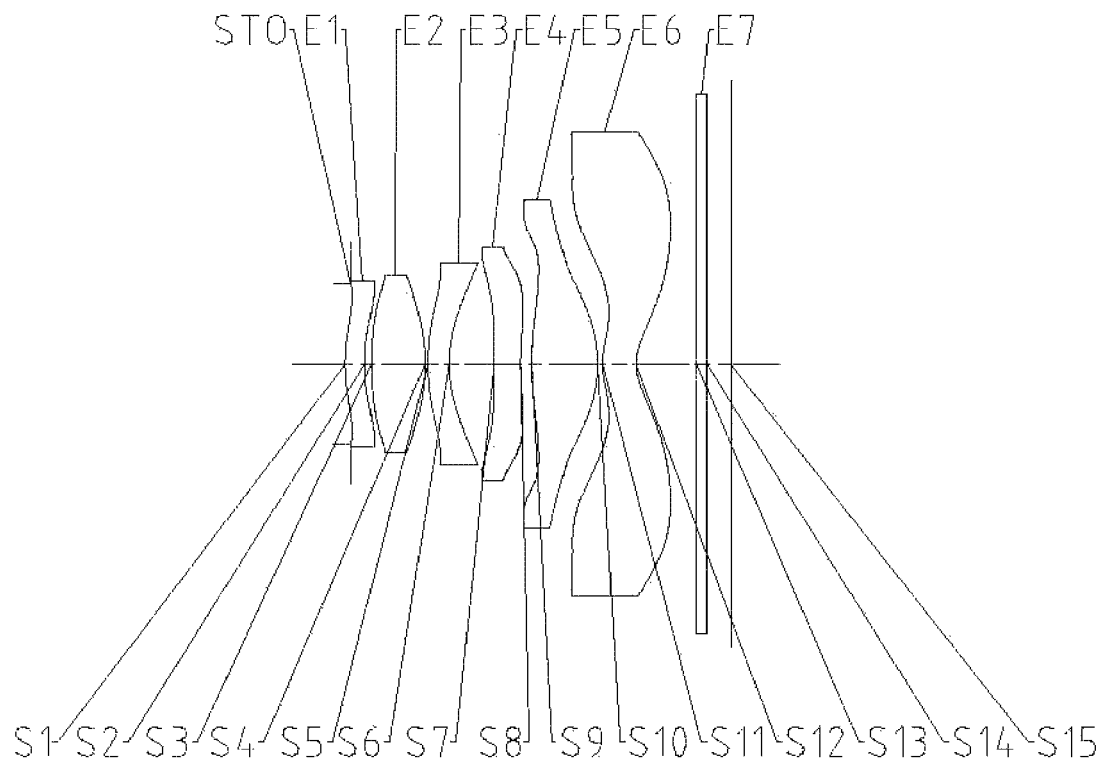
FIG. 7 shows a structural schematic diagram of an optical imaging lens group according to Embodiment 4 of the disclosure.

An optical imaging lens group according to Embodiment 4 of the disclosure is described below with reference to FIGS. 7-8D. FIG. 7 shows a structural schematic diagram of an optical imaging lens group according to Embodiment 4 of the disclosure.

As shown in FIG. 7, the optical imaging lens group sequentially includes from an object side to an image side: a diaphragm STO, a first lens E1, a second lens E2, a third lens E3, a fourth lens E4, a fifth lens E5, a sixth lens E6, an optical filter E7 and an imaging surface S15.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens group is 2.84 mm. TTL is a total length of the optical imaging lens group, and TTL is 4.15 mm. ImgH is a half of a diagonal length of an effective pixel region on the imaging surface S15 of the optical imaging lens group, and ImgH is 3.04 mm. f/EPD is a ratio of the total effective focal length f of the optical imaging lens group to an Entrance Pupil Diameter (EPD) of the optical imaging lens group, and f/EPD is 1.64. Semi-FOV is a half of a maximum field of view of the optical imaging lens group, and Semi-FOV is 46.1°.

Table 7 shows a basic parameter table of the optical imaging lens group of Embodiment 4, wherein the units of the curvature radius, the thickness/distance and the focal length are all millimeters (mm). Tables 8-1 and 8-2 show high-order coefficients that can be used for each aspheric mirror surface in Embodiment 4. A surface type of each aspheric surface may be defined by formula (1) given in Embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 400.0000 | | | | |
| STO | Spherical | Infinite | −0.0592 | | | | |
| S1 | Aspheric | 1.9783 | 0.2100 | 1.65 | 23.5 | −135.50 | −0.6816 |
| S2 | Aspheric | 1.8540 | 0.0742 | | | | −0.8350 |
| S3 | Aspheric | 3.8951 | 0.5764 | 1.55 | 56.1 | 2.17 | 0.0000 |
| S4 | Aspheric | −1.6114 | 0.0300 | | | | 0.0000 |
| S5 | Aspheric | 2.7860 | 0.2300 | 1.67 | 20.4 | −4.47 | 0.0000 |
| S6 | Aspheric | 1.3925 | 0.4840 | | | | 0.0000 |
| S7 | Aspheric | −108.9859 | 0.2809 | 1.57 | 38.0 | −6.76 | −98.0000 |
| S8 | Aspheric | 4.0000 | 0.1227 | | | | 1.7137 |
| S9 | Aspheric | 7.7091 | 0.7095 | 1.55 | 56.1 | 2.39 | 12.2471 |
| S10 | Aspheric | −1.5158 | 0.0555 | | | | −1.0000 |
| S11 | Aspheric | 0.9133 | 0.3566 | 1.54 | 55.9 | −3.53 | −0.9995 |
| S12 | Aspheric | 0.5321 | 0.6541 | | | | −1.0000 |
| S13 | Spherical | Infinite | 0.1100 | 1.52 | 64.2 | | |
| S14 | Spherical | Infinite | 0.2560 | | | | |
| S15 | Spherical | Infinite | | | | | |

TABLE 8-1

| Surface number | A4 | A6 | A8 | A10 | A12 | A14 | A16 |
|---|---|---|---|---|---|---|---|
| S1 | −1.8558E−01 | 8.9900E−01 | −1.2838E+01 | 9.7539E+01 | −4.7956E+02 | 1.5669E+03 | −3.4262E+03 |
| S2 | −5.0645E−02 | −1.6111E+00 | 2.3724E+01 | −2.2599E+02 | 1.4080E+03 | −5.9988E+03 | 1.7896E+04 |
| S3 | 5.3242E−02 | −2.1722E−01 | 4.9749E+00 | −5.0947E+01 | 3.2388E+02 | −1.3608E+03 | 3.9054E+03 |
| S4 | 9.8348E−01 | −9.4302E+00 | 7.7137E+01 | −4.8246E+02 | 2.2457E+03 | −7.6914E+03 | 1.9262E+04 |
| S5 | 6.0468E−01 | −6.3428E+00 | 4.4168E+01 | −2.2561E+02 | 8.3896E+02 | −2.2764E+03 | 4.5125E+03 |
| S6 | −1.9184E−01 | 5.6000E−02 | 1.0005E+00 | −7.3504E+00 | 2.7888E+01 | −6.8275E+01 | 1.1361E+02 |
| S7 | 4.9222E−02 | −2.5369E+00 | 1.3255E+01 | −2.5009E+01 | −7.2383E+01 | 6.1784E+02 | −2.0096E+03 |
| S8 | 6.5825E−01 | −8.2158E+00 | 4.5332E+01 | −1.7456E+02 | 4.9499E+02 | −1.0518E+03 | 1.6827E+03 |
| S9 | 9.1481E−01 | −5.7624E+00 | 2.1969E+01 | −5.9952E+01 | 1.2002E+02 | −1.7791E+02 | 1.9612E+02 |
| S10 | −2.4227E−01 | 1.4231E+00 | −5.5028E+00 | 1.5272E+01 | −2.9221E+01 | 3.8876E+01 | −3.6331E+01 |
| S11 | −1.4269E+00 | 1.2802E+00 | 3.3902E−01 | −2.7163E+00 | 3.9884E+00 | −3.3337E+00 | 1.8034E+00 |
| S12 | −1.8105E+00 | 3.0230E+00 | −3.9635E+00 | 3.9351E+00 | −2.9342E+00 | 1.6395E+00 | −6.8557E−01 |

TABLE 8-2

| Surface number | A18 | A20 | A22 | A24 | A26 | A28 | A30 |
|---|---|---|---|---|---|---|---|
| S1 | 4.9507E+03 | −4.5318E+03 | 2.3786E+03 | −5.4501E+02 | 0.0000E+00 | 0.0000E+00 | 0.0000E+00 |
| S2 | −3.7737E+04 | 5.6007E+04 | −5.7261E+04 | 3.8416E+04 | −1.5234E+04 | 2.7080E+03 | 0.0000E+00 |
| S3 | −7.8070E+03 | 1.0911E+04 | −1.0498E+04 | 6.6532E+03 | −2.5092E+03 | 4.2780E+02 | 0.0000E+00 |
| S4 | −3.4983E+04 | 4.5373E+04 | −4.0845E+04 | 2.4198E+04 | −8.4728E+03 | 1.3271E+03 | 0.0000E+00 |
| S5 | −6.5074E+03 | 6.7367E+03 | −4.8703E+03 | 2.3321E+03 | −6.6421E+02 | 8.5155E+01 | 0.0000E+00 |

TABLE 8-2-continued

| Surface number | A18 | A20 | A22 | A24 | A26 | A28 | A30 |
|---|---|---|---|---|---|---|---|
| S6 | −1.2975E+02 | 9.9984E+01 | −4.9570E+01 | 1.4241E+01 | −1.7974E+00 | 0.0000E+00 | 0.0000E+00 |
| S7 | 4.0196E+03 | −5.4241E+03 | 5.0514E+03 | −3.2113E+03 | 1.3333E+03 | −3.2626E+02 | 3.5702E+01 |
| S8 | −2.0214E+03 | 1.8065E+03 | −1.1796E+03 | 5.4536E+02 | −1.6878E+02 | 3.1322E+01 | −2.6326E+00 |
| S9 | −1.6054E+02 | 9.6785E+01 | −4.2237E+01 | 1.2938E+01 | −2.6321E+00 | 3.1879E−01 | −1.7374E−02 |
| S10 | 2.4040E+01 | −1.1291E+01 | 3.7366E+00 | −8.5181E−01 | 1.2735E−01 | −1.1246E−02 | 4.4484E−04 |
| S11 | −6.5011E−01 | 1.5350E−01 | −2.1781E−02 | 1.2670E−03 | 1.0436E−04 | −2.1736E−05 | 1.0496E−06 |
| S12 | 2.1371E−01 | −4.9235E−02 | 8.2418E−03 | −9.7233E−04 | 7.6501E−05 | −3.5980E−06 | 7.6437E−08 |

Figure 8A:
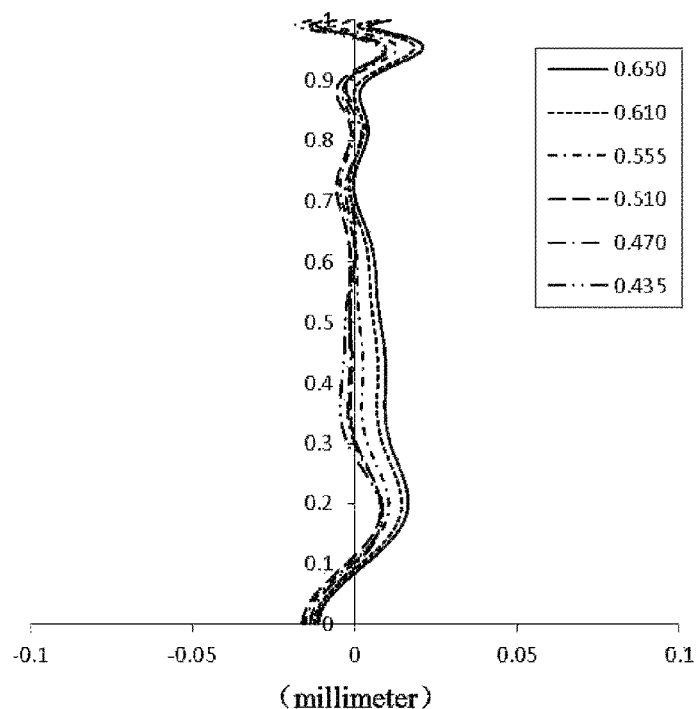
FIGS. 8A-8D show a longitudinal aberration curve, an astigmatism curve, a distortion curve and a lateral color curve of an optical imaging lens group according to Embodiment 4 respectively.
Figure 8B:
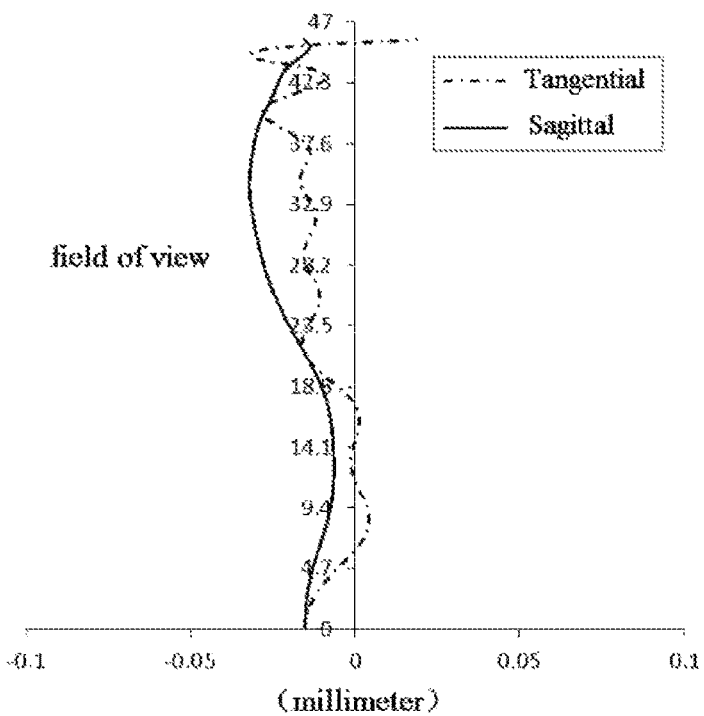
Figure 8C:
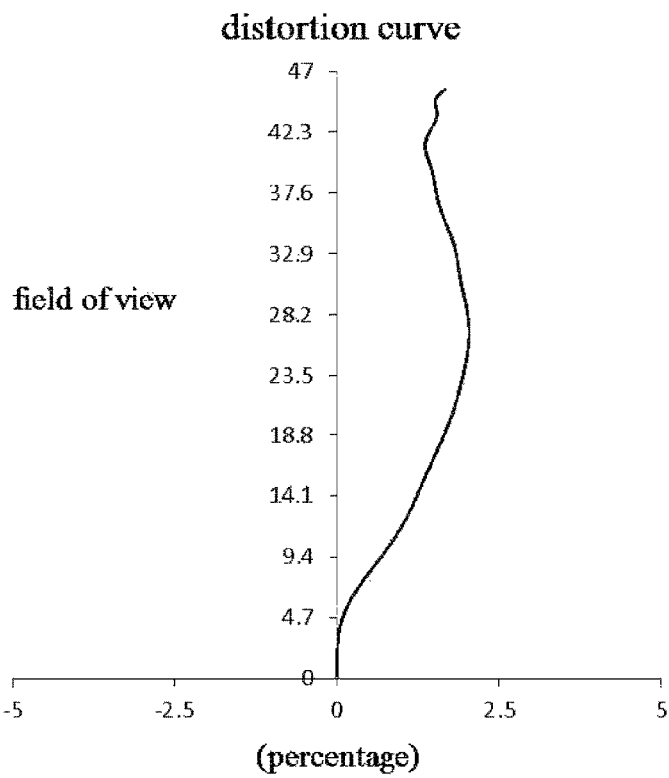
Figure 8D:
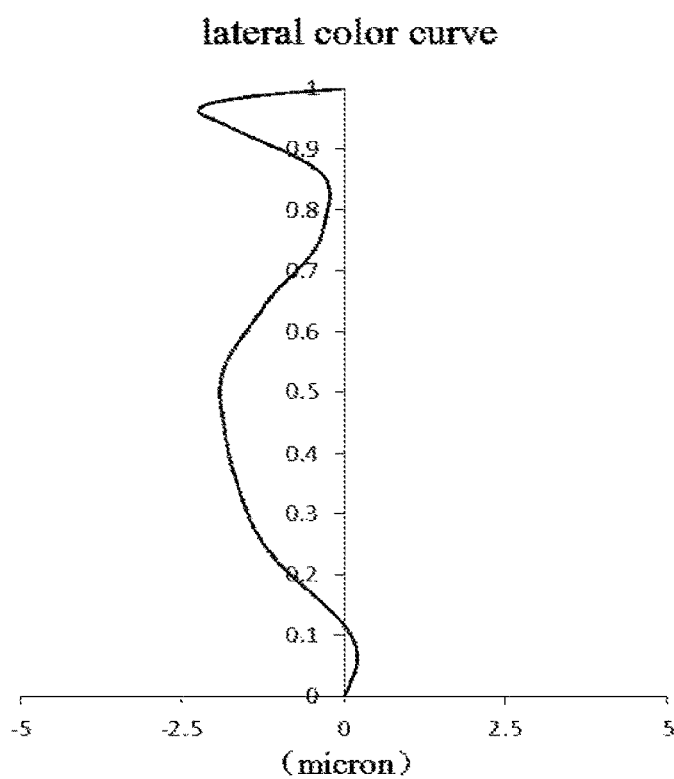

FIG. 8A shows a longitudinal aberration curve of the optical imaging lens group according to Embodiment 4 to represent deviations of a convergence focal point after light with different wavelengths passes through the lens. FIG. 8B shows an astigmatism curve of the optical imaging lens group according to Embodiment 4 to represent a tangential image surface curvature and a sagittal image surface curvature. FIG. 8C shows a distortion curve of the optical imaging lens group according to Embodiment 4 to represent distortion values corresponding to different fields of view. FIG. 8D shows a lateral color curve of the optical imaging lens group according to Embodiment 4 to represent deviations of different image heights on the imaging surface after the light passes through the lens. According to FIGS. 8A-8D, it can be seen that the optical imaging lens group provided in Embodiment 4 may achieve high imaging quality.

Embodiment 5

Figure 9:
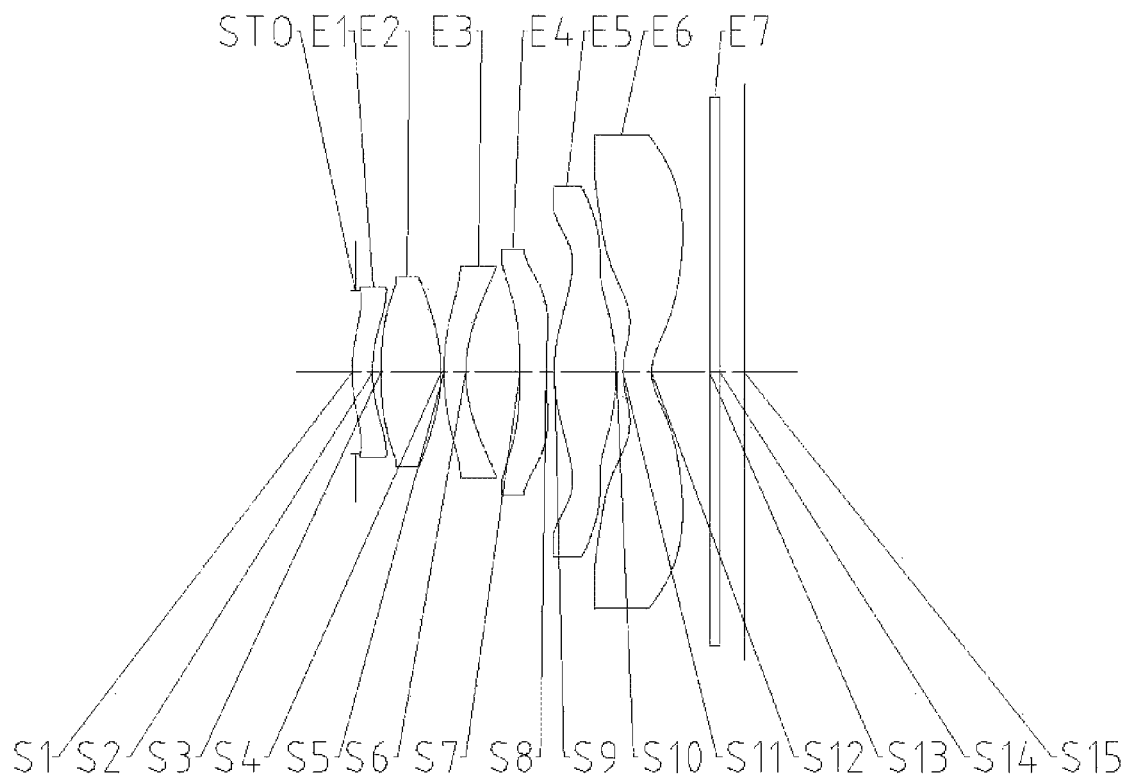
FIG. 9 shows a structural schematic diagram of an optical imaging lens group according to Embodiment 5 of the disclosure.

An optical imaging lens group according to Embodiment 5 of the disclosure is described below with reference to FIGS. 9-10D. FIG. 9 shows a structural schematic diagram of an optical imaging lens group according to Embodiment 5 of the disclosure.

As shown in FIG. 9, the optical imaging lens group sequentially includes from an object side to an image side: a diaphragm STO, a first lens E1, a second lens E2, a third lens E3, a fourth lens E4, a fifth lens E5, a sixth lens E6, an optical filter E7 and an imaging surface S15.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a convex surface, and an image-side surface S6 thereof is a concave surface. The fourth lens E4 has a negative refractive power, an object-side surface S7 thereof is a concave surface, and an image-side surface S8 thereof is a convex surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens group is 2.85 mm. TTL is a total length of the optical imaging lens group, and TTL is 4.12 mm. ImgH is a half of a diagonal length of an effective pixel region on the imaging surface S15 of the optical imaging lens group, and ImgH is 3.04 mm. f/EPD is a ratio of the total effective focal length f of the optical imaging lens group to an Entrance Pupil Diameter (EPD) of the optical imaging lens group, and f/EPD is 1.65. Semi-FOV is a half of a maximum field of view of the optical imaging lens group, and Semi-FOV is 46.2°.

Table 9 shows a basic parameter table of the optical imaging lens group of Embodiment 5, wherein the units of the curvature radius, the thickness/distance and the focal length are all millimeters (mm). Tables 10-1 and 10-2 show high-order coefficients that can be used for each aspheric mirror surface in Embodiment 5. A surface type of each aspheric surface may be defined by formula (1) given in Embodiment 1.

TABLE 9

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 400.0000 | | | | |
| STO | Spherical | Infinite | −0.0313 | | | | |
| S1 | Aspheric | 1.7402 | 0.2144 | 1.65 | 23.5 | −30.93 | −0.7614 |
| S2 | Aspheric | 1.5232 | 0.0872 | | | | 0.0000 |
| S3 | Aspheric | 3.4734 | 0.6329 | 1.55 | 56.1 | 2.05 | 0.0000 |
| S4 | Aspheric | −1.5399 | 0.0300 | | | | 0.0000 |
| S5 | Aspheric | 2.7006 | 0.2300 | 1.67 | 20.4 | −4.71 | 0.0000 |
| S6 | Aspheric | 1.4016 | 0.5700 | | | | 0.0000 |
| S7 | Aspheric | −5.2450 | 0.2770 | 1.57 | 38.0 | −9.36 | 0.0000 |
| S8 | Aspheric | −300.0000 | 0.0872 | | | | 98.0000 |
| S9 | Aspheric | 6.4030 | 0.6490 | 1.55 | 56.1 | 2.46 | 0.0000 |

TABLE 9-continued

| Surface number | Surface type | Curvature radius | Thickness/ distance | Material Refractive index | Abbe number | Focal length | Conic coefficient |
|---|---|---|---|---|---|---|---|
| S10 | Aspheric | −1.6426 | 0.0695 | | | | −1.0000 |
| S11 | Aspheric | 0.9217 | 0.3011 | 1.54 | 55.9 | −2.95 | −1.0000 |
| S12 | Aspheric | 0.5160 | 0.6101 | | | | −1.0000 |
| S13 | Spherical | Infinite | 0.1100 | 1.52 | 64.2 | | |
| S14 | Spherical | Infinite | 0.2560 | | | | |
| S15 | Spherical | Infinite | | | | | |

TABLE 10-1

| Surface number | A4 | A6 | A8 | A10 | A12 | A14 | A16 |
|---|---|---|---|---|---|---|---|
| S1 | −1.7152E−01 | 1.2170E+00 | −2.4172E+01 | 2.5404E+02 | −1.7346E+03 | 8.0678E+03 | −2.6229E+04 |
| S2 | −9.7790E−02 | −1.6512E−01 | −4.8918E+00 | 8.5639E+01 | −7.8562E+02 | 4.6357E+03 | −1.8747E+04 |
| S3 | 8.1585E−02 | −1.0236E+00 | 1.5187E+01 | −1.4032E+02 | 8.5123E+02 | −3.4789E+03 | 9.7941E+03 |
| S4 | 7.7816E−01 | −6.6215E+00 | 4.7012E+01 | −2.5265E+02 | 1.0111E+03 | −2.9925E+03 | 6.5321E+03 |
| S5 | 4.2699E−01 | −4.2458E+00 | 2.6550E+01 | −1.2032E+02 | 3.9609E+02 | −9.4225E+02 | 1.6018E+03 |
| S6 | −2.3076E−01 | 4.2135E−01 | −1.3665E+00 | 2.7271E+00 | 2.1535E+00 | −3.6008E+01 | 1.3216E+02 |
| S7 | 1.9035E−02 | 1.4830E+00 | −3.2879E+01 | 2.6022E+02 | −1.1995E+03 | 3.6690E+03 | −7.8688E+03 |
| S8 | 1.4992E+00 | −9.5088E+00 | 2.3583E+01 | −8.7596E+00 | −1.2544E+02 | 4.4315E+02 | −8.3078E+02 |
| S9 | 1.9175E+00 | −9.8549E+00 | 2.9763E+01 | −6.1948E+01 | 9.3128E+01 | −1.0320E+02 | 8.5126E+01 |
| S10 | 7.7352E−01 | −3.0653E+00 | 7.7238E+00 | −1.3862E+01 | 1.8936E+01 | −1.9383E+01 | 1.4555E+01 |
| S11 | −8.2146E−01 | −2.1516E+00 | 7.8769E+00 | −1.1998E+01 | 1.1204E+01 | −7.0135E+00 | 3.0358E+00 |
| S12 | −1.9044E+00 | 2.7971E+00 | −3.1173E+00 | 2.7131E+00 | −1.8584E+00 | 9.9133E−01 | −4.0557E−01 |

TABLE 10-2

| Surface number | A18 | A20 | A22 | A24 | A26 | A28 | A30 |
|---|---|---|---|---|---|---|---|
| S1 | 6.0248E+04 | −9.7410E+04 | 1.0853E+05 | −7.9361E+04 | 3.4295E+04 | −6.6391E+03 | 0.0000E+00 |
| S2 | 5.3357E+04 | −1.0778E+05 | 1.5358E+05 | −1.5081E+05 | 9.7075E+04 | −3.6852E+04 | 6.2527E+03 |
| S3 | −1.9204E+04 | 2.6118E+04 | −2.4059E+04 | 1.4184E+04 | −4.6858E+03 | 5.4691E+02 | 5.9218E+01 |
| S4 | −1.0448E+04 | 1.2071E+04 | −9.7948E+03 | 5.3030E+03 | −1.7330E+03 | 2.6898E+02 | −5.6186E+00 |
| S5 | −1.8949E+03 | 1.4589E+03 | −5.8530E+02 | −5.2033E+01 | 1.8788E+02 | −8.6821E+01 | 1.4179E+01 |
| S6 | −2.8973E+02 | 4.2712E+02 | −4.3395E+02 | 3.0020E+02 | −1.3510E+02 | 3.5651E+01 | −4.1837E+00 |
| S7 | 1.2128E+04 | −1.3525E+04 | 1.0827E+04 | −6.0662E+03 | 2.2586E+03 | −5.0187E+02 | 5.0353E+01 |
| S8 | 1.0224E+03 | −8.7268E+02 | 5.2205E+02 | −2.1519E+02 | 5.8259E+01 | −9.3239E+00 | 6.6807E−01 |
| S9 | −5.2410E+01 | 2.3967E+01 | −8.0193E+00 | 1.9054E+00 | −3.0415E−01 | 2.9222E−02 | −1.2759E−03 |
| S10 | −7.9408E+00 | 3.1263E+00 | −8.7691E−01 | 1.7068E−01 | −2.1888E−02 | 1.6621E−03 | −5.6595E−05 |
| S11 | −9.1383E−01 | 1.8828E−01 | −2.5277E−02 | 1.9341E−03 | −4.3159E−05 | −4.4772E−06 | 2.6607E−07 |
| S12 | 1.2539E−01 | −2.8840E−02 | 4.8326E−03 | −5.7099E−04 | 4.4964E−05 | −2.1141E−06 | 4.4835E−08 |

Figure 10A:
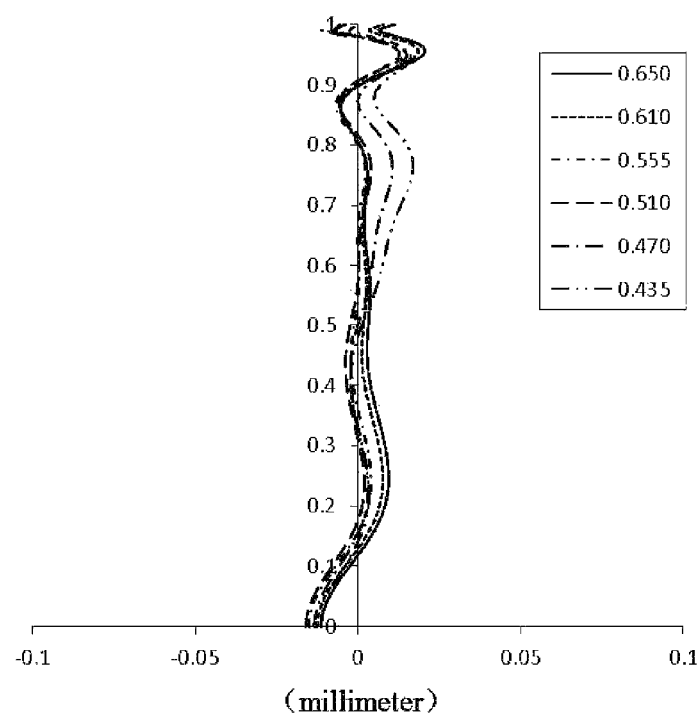
FIGS. 10A-10D show a longitudinal aberration curve, an astigmatism curve, a distortion curve and a lateral color curve of an optical imaging lens group according to Embodiment 5 respectively.
Figure 10B:
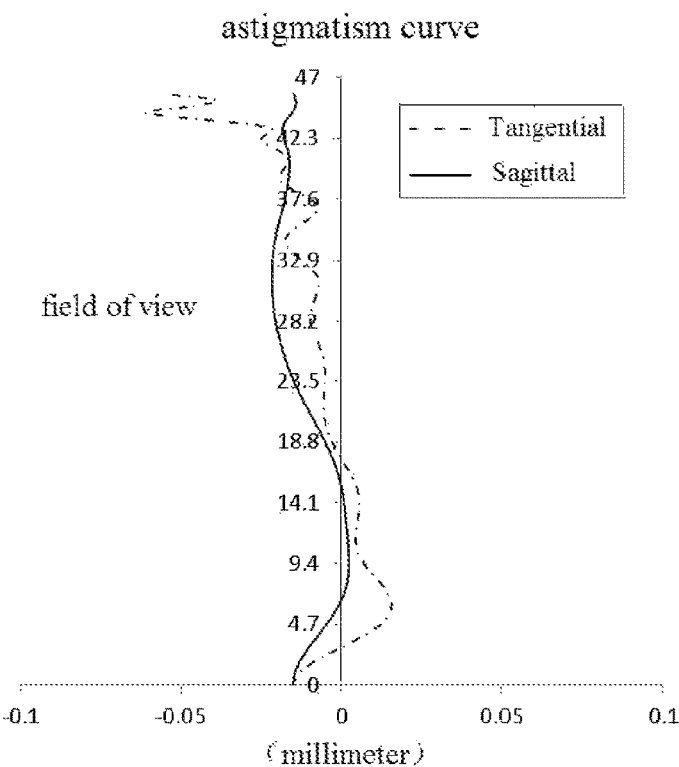
Figure 10C:
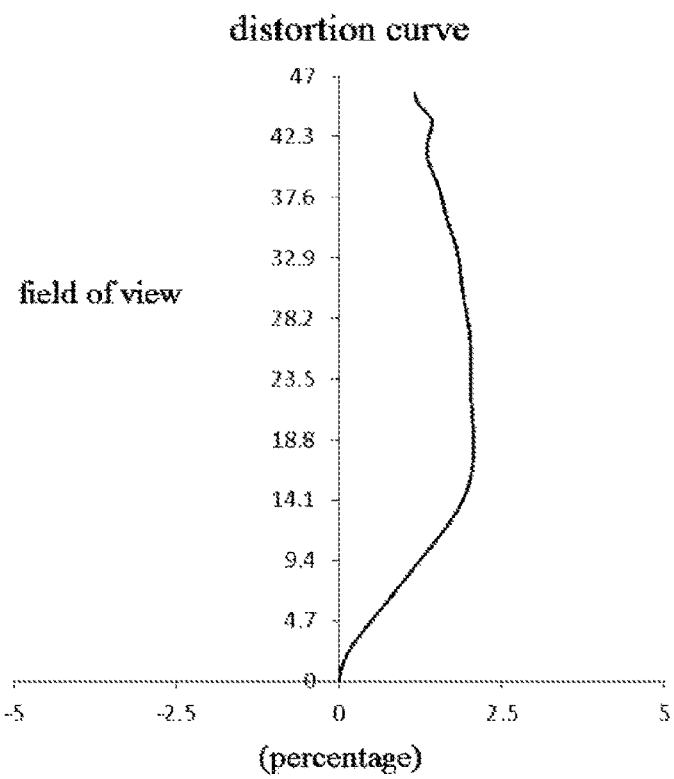
Figure 10D:
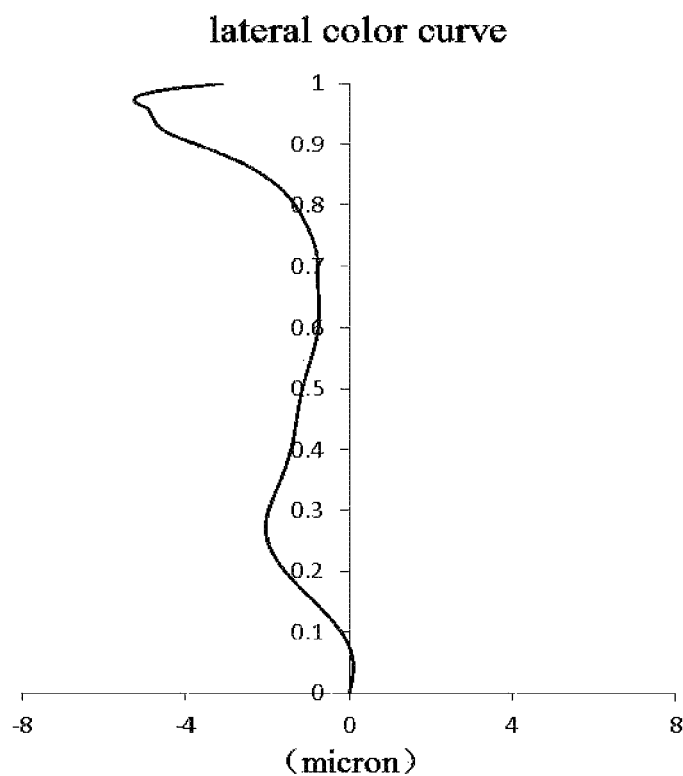

FIG. 10A shows a longitudinal aberration curve of the optical imaging lens group according to Embodiment 5 to represent deviations of a convergence focal point after light with different wavelengths passes through the lens. FIG. 10B shows an astigmatism curve of the optical imaging lens group according to Embodiment 5 to represent a tangential image surface curvature and a sagittal image surface curvature. FIG. 10C shows a distortion curve of the optical imaging lens group according to Embodiment 5 to represent distortion values corresponding to different fields of view. FIG. 10D shows a lateral color curve of the optical imaging lens group according to Embodiment 5 to represent deviations of different image heights on the imaging surface after the light passes through the lens. According to FIGS. 10A-10D, it can be seen that the optical imaging lens group provided in Embodiment 5 may achieve high imaging quality.

Embodiment 6

Figure 11:
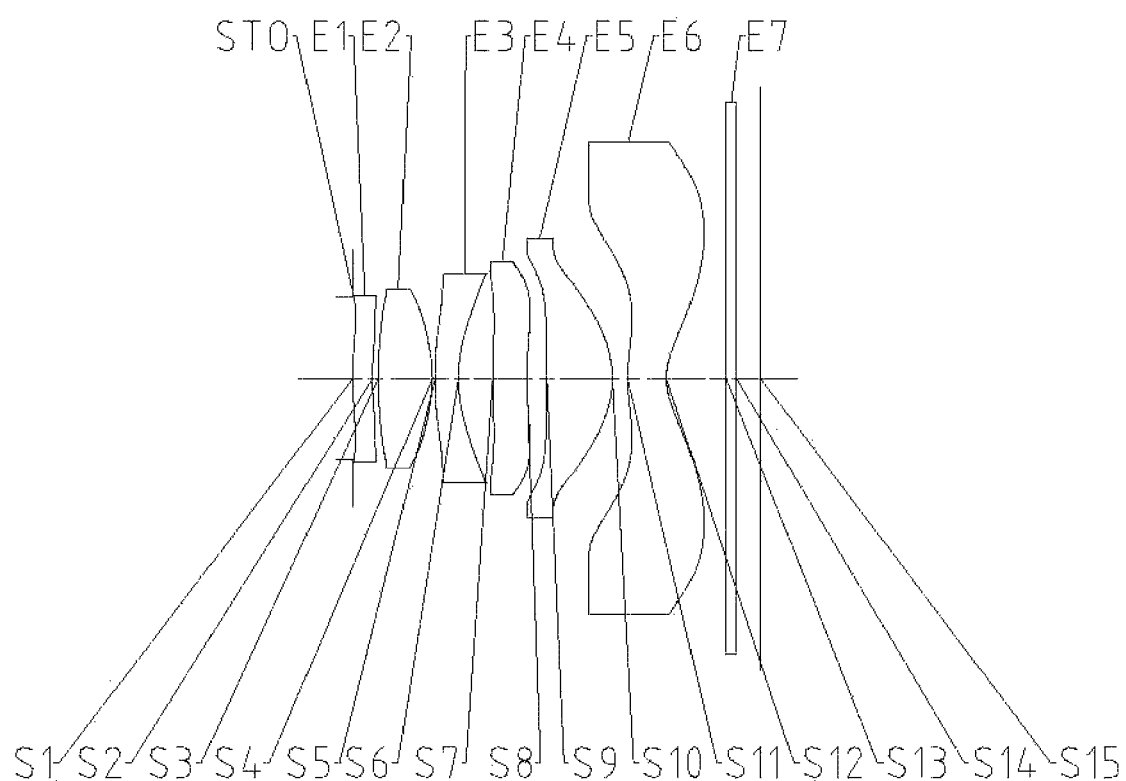
FIG. 11 shows a structural schematic diagram of an optical imaging lens group according to Embodiment 6 of the disclosure.

An optical imaging lens group according to Embodiment 6 of the disclosure is described below with reference to FIGS. 11-12D. FIG. 11 shows a structural schematic diagram of an optical imaging lens group according to Embodiment 6 of the disclosure.

As shown in FIG. 11, the optical imaging lens group sequentially includes from an object side to an image side: a diaphragm STO, a first lens E1, a second lens E2, a third lens E3, a fourth lens E4, a fifth lens E5, a sixth lens E6, an optical filter E7 and an imaging surface S15.

The first lens E1 has a negative refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a convex surface. The third lens E3 has a negative refractive power, an object-side surface S5 thereof is a concave surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. An optical filter E7 has an object-side surface S13 and an image-side surface S14. Light from an object sequentially penetrates through each of the surfaces S1 to S14 and is finally imaged on the imaging surface S15.

In the embodiment, a total effective focal length f of the optical imaging lens group is 2.83 mm. TTL is a total length of the optical imaging lens group, and TTL is 4.30 mm. ImgH is a half of a diagonal length of an effective pixel region on the imaging surface S15 of the optical imaging lens group, and ImgH is 3.04 mm. f/EPD is a ratio of the total effective focal length f of the optical imaging lens group to an Entrance Pupil Diameter (EPD) of the optical imaging lens group, and f/EPD is 1.63. Semi-FOV is a half of a maximum field of view of the optical imaging lens group, and Semi-FOV is 46.2°.

Table 11 shows a basic parameter table of the optical imaging lens group of Embodiment 6, wherein the units of the curvature radius, the thickness/distance and the focal length are all millimeters (mm). Tables 12-1 and 12-2 show high-order coefficients that can be used for each aspheric mirror surface in Embodiment 6. A surface type of each aspheric surface may be defined by formula (1) given in Embodiment 1.

TABLE 11

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | 400.0000 | | | | |
| STO | Spherical | Infinite | −0.0088 | | | | |
| S1 | Aspheric | 3.4368 | 0.2100 | 1.65 | 23.5 | −87.36 | −0.1510 |
| S2 | Aspheric | 3.1613 | 0.0593 | | | | 1.4349 |
| S3 | Aspheric | 3.6586 | 0.5691 | 1.55 | 56.1 | 1.67 | 0.0000 |
| S4 | Aspheric | −1.1445 | 0.0300 | | | | −0.2434 |
| S5 | Aspheric | −700.0000 | 0.2466 | 1.67 | 20.4 | −2.35 | 0.0000 |
| S6 | Aspheric | 1.5652 | 0.3641 | | | | 0.0000 |
| S7 | Aspheric | 5.9310 | 0.3531 | 1.57 | 38.0 | −15.78 | 0.0000 |
| S8 | Aspheric | 3.4982 | 0.2128 | | | | 0.0000 |
| S9 | Aspheric | −16.2710 | 0.6891 | 1.55 | 56.1 | 1.88 | 0.0000 |
| S10 | Aspheric | −0.9785 | 0.1615 | | | | −1.0000 |
| S11 | Aspheric | 2.0543 | 0.4096 | 1.54 | 55.9 | −2.15 | 0.0000 |
| S12 | Aspheric | 0.6884 | 0.6287 | | | | −1.0000 |
| S13 | Spherical | Infinite | 0.1100 | 1.52 | 64.2 | | |
| S14 | Spherical | Infinite | 0.2560 | | | | |
| S15 | Spherical | Infinite | | | | | |

TABLE 12-1

| Surface number | A4 | A6 | A8 | A10 | A12 | A14 | A16 |
|---|---|---|---|---|---|---|---|
| S1 | −3.1058E−01 | 4.4898E+00 | −8.1865E+01 | 9.2915E+02 | −7.0068E+03 | 3.6620E+04 | −1.3630E+05 |
| S2 | −2.4367E−01 | −7.4923E−01 | 1.7767E+01 | −2.1456E+02 | 1.6809E+03 | −9.0723E+03 | 3.4666E+04 |
| S3 | −1.0548E−01 | −3.1590E−01 | 7.8662E+00 | −8.5272E+01 | 5.9454E+02 | −2.8864E+03 | 1.0055E+04 |
| S4 | 2.7275E+00 | −2.6957E+01 | 2.1211E+02 | −1.2636E+03 | 5.6378E+03 | −1.8829E+04 | 4.7107E+04 |
| S5 | 2.2106E+00 | −2.2515E+01 | 1.6619E+02 | −9.0658E+02 | 3.6475E+03 | −1.0887E+04 | 2.4230E+04 |
| S6 | −3.5168E−02 | −7.7721E−01 | 2.9912E+00 | −7.2713E−01 | −4.5621E+01 | 2.3170E+02 | −6.3305E+02 |
| S7 | −1.5648E−01 | 2.4402E−02 | −4.5747E−01 | 7.5028E+00 | −4.2999E+01 | 1.4484E+02 | −3.2858E+02 |
| S8 | −8.7787E−02 | −1.0137E+00 | 7.3648E+00 | −3.5866E+01 | 1.2605E+02 | −3.2203E+02 | 5.9995E+02 |
| S9 | 1.3772E−01 | −6.4601E−01 | 1.0822E+00 | 1.5083E+00 | −1.5996E+01 | 5.3738E+01 | −1.1143E+02 |
| S10 | 3.8358E−01 | −1.1029E+00 | 2.7180E+00 | −6.0161E+00 | 1.2685E+01 | −2.3439E+01 | 3.3918E+01 |
| S11 | −2.7528E−01 | −7.6068E−01 | 2.9740E+00 | −5.8474E+00 | 7.7065E+00 | −7.3038E+00 | 5.1028E+00 |
| S12 | −9.9346E−01 | 1.3649E+00 | −1.6318E+00 | 1.5528E+00 | −1.1359E+00 | 6.2779E−01 | −2.5990E−01 |

TABLE 12-2

| Surface number | A18 | A20 | A22 | A24 | A26 | A28 | A30 |
|---|---|---|---|---|---|---|---|
| S1 | 3.6649E+05 | −7.1388E+05 | 9.9745E+05 | −9.7394E+05 | 6.3066E+05 | −2.4318E+05 | 4.2243E+04 |
| S2 | −9.4833E+04 | 1.8600E+05 | −2.5914E+05 | 2.5018E+05 | −1.5905E+05 | 5.9866E+04 | −1.0105E+04 |
| S3 | −2.5318E+04 | 4.5975E+04 | −5.9520E+04 | 5.3548E+04 | −3.1807E+04 | 1.1216E+04 | −1.7782E+03 |
| S4 | −8.8082E+04 | 1.2211E+05 | −1.2344E+05 | 8.8233E+04 | −4.2192E+04 | 1.2094E+04 | −1.5696E+03 |
| S5 | −4.0228E+04 | 4.9518E+04 | −4.4492E+04 | 2.8321E+04 | −1.2087E+04 | 3.0998E+03 | −3.6090E+02 |
| S6 | 1.1261E+03 | −1.3764E+03 | 1.1691E+03 | −6.7955E+02 | 2.5801E+02 | −5.7674E+01 | 5.7555E+00 |
| S7 | 5.2927E+02 | −6.1654E+02 | 5.1766E+02 | −3.0588E+02 | 1.2071E+02 | −2.8533E+01 | 3.0509E+00 |
| S8 | −8.1756E+02 | 8.1305E+02 | −5.8310E+02 | 2.9358E+02 | −9.8442E+01 | 1.9738E+01 | −1.7899E+00 |
| S9 | 1.5750E+02 | −1.5585E+02 | 1.0795E+02 | −5.1251E+01 | 1.5875E+01 | −2.8882E+00 | 2.3394E−01 |
| S10 | −3.6151E+01 | 2.7616E+01 | −1.4823E+01 | 5.4360E+00 | −1.2943E+00 | 1.8010E−01 | −1.1112E−02 |
| S11 | −2.6419E+00 | 1.0072E+00 | −2.7804E−01 | 5.3900E−02 | −6.9442E−03 | 5.3317E−04 | −1.8445E−05 |
| S12 | 8.0094E−02 | −1.8208E−02 | 3.0036E−03 | −3.4891E−04 | 2.7027E−05 | −1.2519E−06 | 2.6214E−08 |

Figure 12A:
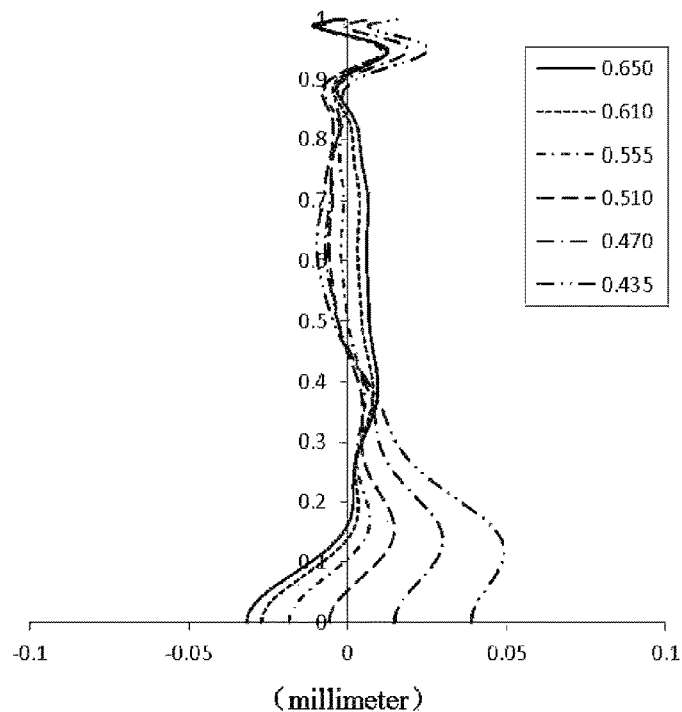
FIGS. 12A-12D show a longitudinal aberration curve, an astigmatism curve, a distortion curve and a lateral color curve of an optical imaging lens group according to Embodiment 6 respectively.
Figure 12B:
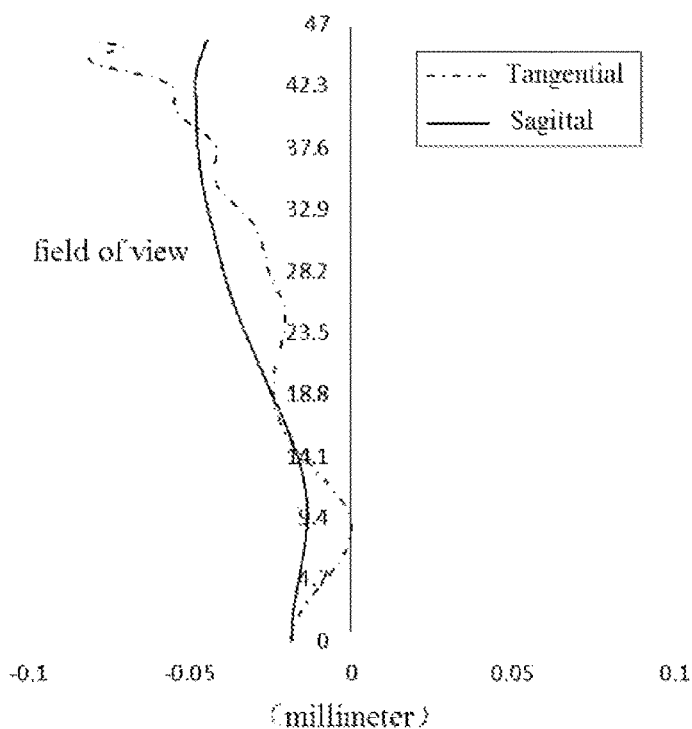
Figure 12C:
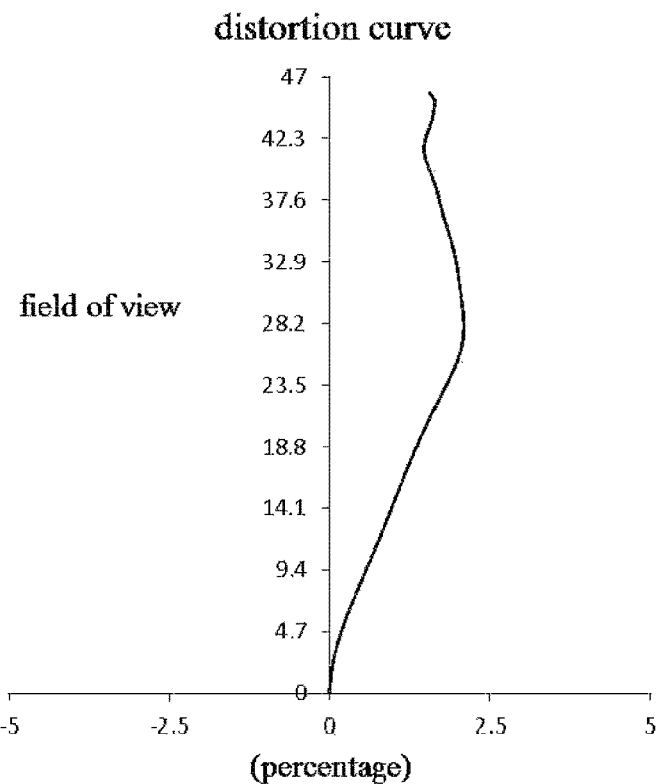
Figure 12D:
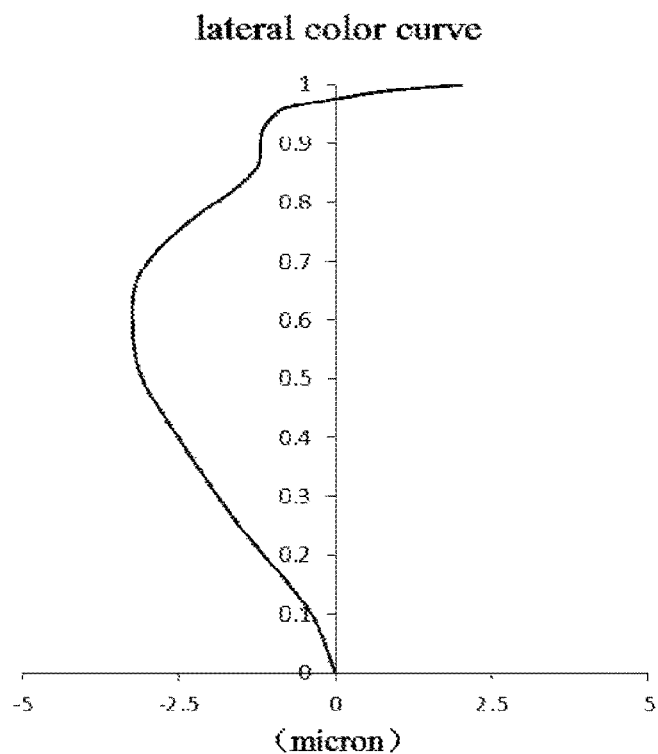

FIG. 12A shows a longitudinal aberration curve of the optical imaging lens group according to Embodiment 6 to represent deviations of a convergence focal point after light with different wavelengths passes through the lens. FIG. 12B shows an astigmatism curve of the optical imaging lens group according to Embodiment 6 to represent a tangential image surface curvature and a sagittal image surface curvature. FIG. 12C shows a distortion curve of the optical imaging lens group according to Embodiment 6 to represent distortion values corresponding to different fields of view. FIG. 12D shows a lateral color curve of the optical imaging lens group according to Embodiment 6 to represent deviations of different image heights on the imaging surface after the light passes through the lens. According to FIGS. 12A-12D, it can be seen that the optical imaging lens group provided in Embodiment 6 may achieve high imaging quality.

From the above, Embodiment 1 to Embodiment 6 satisfy a relationship shown in Table 13 respectively.

TABLE 13

| Conditional expression | Embodiment | | | | | |
| --- | --- | --- | --- | --- | --- | --- |
| | 1 | 2 | 3 | 4 | 5 | 6 |
| f2/R3 | 0.60 | 0.74 | 0.71 | 0.56 | 0.59 | 0.46 |
| TTL/ImgH | 1.36 | 1.41 | 1.37 | 1.37 | 1.36 | 1.41 |
| (R1 + R2)/(R3 − R4) | 0.65 | 0.99 | 0.77 | 0.70 | 0.65 | 1.37 |
| f45/f123 | 1.00 | 0.42 | 0.48 | 0.87 | 0.85 | 0.47 |
| (f6 − f5)/f4 | 0.56 | 0.31 | 0.38 | 0.87 | 0.58 | 0.26 |
| SAG22/SAG52 | 0.51 | 0.36 | 0.33 | 0.40 | 0.64 | 0.39 |
| Yc61/DT61 | 0.96 | 0.36 | 0.29 | 0.98 | 0.24 | 0.33 |
| DT21/DT41 | 0.56 | 0.67 | 0.67 | 0.59 | 0.55 | 0.69 |
| (R11 + R12)/(R6 − R10) | 0.45 | 1.41 | 1.27 | 0.50 | 0.47 | 1.08 |
| CT1/ET1 + CT3/ET3 | 1.87 | 1.73 | 1.74 | 1.79 | 1.90 | 1.71 |
| CT6/CT5 | 0.49 | 0.57 | 0.52 | 0.50 | 0.46 | 0.59 |
| T34/ΣAT | 0.68 | 0.42 | 0.49 | 0.63 | 0.68 | 0.44 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens group.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens group having only six lenses with refractive power, sequentially comprising from an object side to an image side along an optical axis:
   a first lens with a negative refractive power;
   a second lens with a refractive power;
   a third lens with a refractive power, an image-side surface thereof is a concave surface;
   a fourth lens with a negative refractive power;
   a fifth lens with a refractive power; and
   a sixth lens with a refractive power;
   wherein Semi-FOV is a half of a maximum field of view of the optical imaging lens group, and Semi-FOV satisfies 45°<Semi-FOV<55°;
   a curvature radius R1 of an object-side surface of the first lens, a curvature radius R2 of an image-side surface of the first lens, a curvature radius R3 of an object-side surface of the second lens and a curvature radius R4 of an image-side surface of the second lens satisfy 0.5<(R1+R2)/(R3−R4)<1.5;
   ΣAT is a sum of spacing distances of any two adjacent lenses in the first lens to the sixth lens, and ΣAT and a spacing distance T34 of the third lens and the fourth lens on the optical axis satisfy 0.42<T34/ΣAT<0.8.

2. The optical imaging lens group according to claim 1, wherein an effective focal length f2 of the second lens and the curvature radius R3 of the object-side surface of the second lens satisfy 0.4<f2/R3<0.9.

3. The optical imaging lens group according to claim 1, wherein an effective focal length f4 of the fourth lens, an effective focal length f5 of the fifth lens and an effective focal length f6 of the sixth lens satisfy 0<(f6−f5)/f4<1.0.

4. The optical imaging lens group according to claim 1, wherein SAG22 is a distance from an intersection point of the image-side surface of the second lens and the optical axis to an effective radius vertex of the image-side surface of the second lens on the optical axis, SAG52 is a distance from an intersection point of an image-side surface of the fifth lens and the optical axis to an effective radius vertex of the image-side surface of the fifth lens on the optical axis, and SAG22 and SAG52 satisfy 0.2<SAG22/SAG52<0.7.

5. The optical imaging lens group according to claim 1, wherein an object-side surface of the sixth lens has at least one point of inflection, and a vertical distance Yc61 from the point of inflection to the optical axis and a maximum effective radius DT61 of the object-side surface of the sixth lens satisfy 0<Yc61/DT61<1.0.

6. The optical imaging lens group according to claim 1, wherein a maximum effective radius DT21 of the object-side surface of the second lens and a maximum effective radius DT41 of an object-side surface of the fourth lens satisfy 0.3<DT21/DT41<0.8.

7. The optical imaging lens group according to claim 1, wherein a curvature radius R6 of the image-side surface of the third lens, a curvature radius R10 of an image-side surface of the fifth lens, a curvature radius R11 of an object-side surface of the sixth lens and a curvature radius R12 of an image-side surface of the sixth lens satisfy 0.3<(R11+R12)/(R6−R10)<2.0.

8. The optical imaging lens group according to claim 1, wherein a center thickness CT1 of the first lens on the optical axis, a center thickness CT3 of the third lens on the optical axis, an edge thickness ET1 of the first lens and an edge thickness ET3 of the third lens satisfy 1.5<CT1/ET1+CT3/ET3<2.0.

9. The optical imaging lens group according to claim 1, wherein a center thickness CT5 of the fifth lens on the optical axis and a center thickness CT6 of the sixth lens on the optical axis satisfy 0.2<CT6/CT5<0.7.

10. The optical imaging lens group according to claim 1, wherein
   the object-side surface of the first lens is a convex surface, and the image-side surface of the first lens is a concave surface;

the second lens has a positive refractive power, the object-side surface thereof is a convex surface, and the image-side surface thereof is a convex surface;

the third lens has a negative refractive power;

the fifth lens has a positive refractive power, an image-side surface thereof is a convex surface;

the sixth lens has a negative refractive power, an object-side surface thereof is a convex surface, and an image-side surface thereof is a concave surface.

11. The optical imaging lens group according to claim 1, wherein EPD is an entrance pupil diameter of the optical imaging lens group, and EPD and a total effective focal length f of the optical imaging lens group satisfy f/EPD<1.7.

12. The optical imaging lens group according to claim 1, wherein TTL is a distance from the object-side surface of the first lens to an imaging surface of the optical imaging lens group on the optical axis, ImgH is a half of a diagonal length of an effective pixel region on the imaging surface of the optical imaging lens group, and TTL and ImgH satisfy TTL/ImgH<1.5.

13. An optical imaging lens group having only six lenses with refractive power, sequentially comprising from an object side to an image side along an optical axis:
- a first lens with a negative refractive power;
- a second lens with a refractive power;
- a third lens with a refractive power, an image-side surface thereof is a concave surface;
- a fourth lens with a negative refractive power;
- a fifth lens with a refractive power; and
- a sixth lens with a refractive power,
- wherein Semi-FOV is a half of a maximum field of view of the optical imaging lens group, and Semi-FOV satisfies 45°<Semi-FOV<55°; and
- a combined focal length f123 of the first lens, the second lens and the third lens and a combined focal length f45 of the fourth lens and the fifth lens satisfy 0.3<f45/f123<1.3;
- a curvature radius R1 of an object-side surface of the first lens, a curvature radius R2 of an image-side surface of the first lens, a curvature radius R3 of an object-side surface of the second lens and a curvature radius R4 of an image-side surface of the second lens satisfy 0.5<(R1+R2)/(R3−R4)<1.5;
- ΣAT is a sum of spacing distances of any two adjacent lenses in the first lens to the sixth lens, and ΣAT and a spacing distance T34 of the third lens and the fourth lens on the optical axis satisfy 0.42<T34/ΣAT<0.8.

14. The optical imaging lens group according to claim 13, wherein an effective focal length f2 of the second lens and a curvature radius R3 of an object-side surface of the second lens satisfy 0.4<f2/R3<0.9.

15. The optical imaging lens group according to claim 13, wherein an effective focal length f4 of the fourth lens, an effective focal length f5 of the fifth lens and an effective focal length f6 of the sixth lens satisfy 0<(f6−f5)/f4<1.0.

16. The optical imaging lens group according to claim 13, wherein SAG22 is a distance from an intersection point of an image-side surface of the second lens and the optical axis to an effective radius vertex of the image-side surface of the second lens on the optical axis, SAG52 is a distance from an intersection point of an image-side surface of the fifth lens and the optical axis to an effective radius vertex of the image-side surface of the fifth lens on the optical axis, and SAG22 and SAG52 satisfy 0.2<SAG22/SAG52<0.7.

17. The optical imaging lens group according to claim 13, wherein an object-side surface of the sixth lens has at least one point of inflection, and a vertical distance Yc61 from the point of inflection to the optical axis and a maximum effective radius DT61 of the object-side surface of the sixth lens satisfy 0<Yc61/DT61<1.0.

18. The optical imaging lens group according to claim 13, wherein a maximum effective radius DT21 of an object-side surface of the second lens and a maximum effective radius DT41 of an object-side surface of the fourth lens satisfy 0.3<DT21/DT41<0.8.

* * * * *